United States Patent [19]

Pavley et al.

[11] Patent Number: 5,740,455
[45] Date of Patent: *Apr. 14, 1998

[54] ENHANCED COMPOUND DOCUMENT PROCESSING ARCHITECTURES AND METHODS THEREFOR

[75] Inventors: John Franklin Pavley, Cupertino; John Benton Turner, II; Gary Stephen Hanson, both of Mountain View, all of Calif.

[73] Assignee: Apple Computer, Inc., Cupertino, Calif.

[*] Notice: The term of this patent shall not extend beyond the expiration date of Pat. No. 5,644,208.

[21] Appl. No.: 441,883

[22] Filed: May 16, 1995

[51] Int. Cl.$^6$ ............................ G06F 17/00; G06F 15/163
[52] U.S. Cl. ........................... 395/777; 395/778; 395/793; 395/680; 395/682; 345/335
[58] Field of Search ................................. 395/145, 147, 395/148, 700, 682, 683, 776–778, 793, 680; 345/335

[56] References Cited

U.S. PATENT DOCUMENTS

| | | | |
|---|---|---|---|
| 4,723,210 | 2/1988 | Barker et al. | 395/147 |
| 4,723,211 | 2/1988 | Barker et al. | 395/147 |
| 4,739,477 | 4/1988 | Barker et al. | 395/600 |
| 4,815,029 | 3/1989 | Barker et al. | 395/146 |
| 4,868,765 | 9/1989 | Diefendorff | 395/157 |
| 4,933,880 | 6/1990 | Borgendale et al. | 395/147 |
| 4,959,769 | 9/1990 | Cooper et al. | 395/600 |
| 4,969,093 | 11/1990 | Barker et al. | 395/800 |
| 4,974,194 | 11/1990 | Barker et al. | 364/419.14 |
| 5,133,070 | 7/1992 | Barker et al. | 395/650 |
| 5,140,677 | 8/1992 | Fleming et al. | 395/159 |
| 5,142,618 | 8/1992 | Fujiwara et al. | 395/146 |
| 5,181,162 | 1/1993 | Smith et al. | 364/419 |
| 5,206,951 | 4/1993 | Khoyi et al. | 395/650 |
| 5,212,770 | 5/1993 | Smith et al. | 395/155 |
| 5,226,161 | 7/1993 | Khoyi et al. | 395/650 |

(List continued on next page.)

FOREIGN PATENT DOCUMENTS

| | | |
|---|---|---|
| 173 125 | 3/1986 | European Pat. Off. . |
| 530 122 A1 | 3/1993 | European Pat. Off. . |
| 578 204 A2 | 1/1994 | European Pat. Off. . |
| 578 207 A2 | 1/1994 | European Pat. Off. . |

OTHER PUBLICATIONS

R.E. Berry, *"The Designer's Model of the CUA Workplace,"* IBM Systems Journal, vol. 31, No. 3, Armonk, NY (1992).

(List continued on next page.)

*Primary Examiner*—Joseph R. Burwell
*Attorney, Agent, or Firm*—Hickman Beyer & Weaver

[57] ABSTRACT

A computer program product, which includes a computer usable medium having computer readable code embodied therein for processing data in a compound document. The compound document includes a plurality of embedded object editors for respectively rendering data having different interest types in different compound document content areas. The compound document further includes a plurality of editing controllers embedded in the compound document. The inventive computer program product includes computer readable program code configured to cause a computer to detect whether a selection is made in one of the data. Furthermore, there is included computer readable program code configured to cause the computer to effect the filling out of an auditor data structure with attributes of the selection by the object editor that is associated with the data in which the selection is made. The inventive computer program product also includes computer readable program code configured to cause the computer to communicate the attributes embodied in data fields of the auditor data structure from the above-mentioned object editor to selective interested ones of the editing controllers. In one embodiment, both the above-mentioned object editor and the interested editing controllers register with a data switching system to receive attribute data having an interest represented by the attributes of the aforementioned selection.

37 Claims, 12 Drawing Sheets

U.S. PATENT DOCUMENTS

| | | | |
|---|---|---|---|
| 5,303,379 | 4/1994 | Khoyi et al. | 395/700 |
| 5,339,430 | 8/1994 | Lundin et al. | 395/700 |
| 5,341,478 | 8/1994 | Travis, Jr. et al. | 395/200 |
| 5,345,551 | 9/1994 | Shelley et al. | 395/157 |
| 5,369,778 | 11/1994 | San Soucie et al. | 395/800 |
| 5,408,599 | 4/1995 | Nomura et al. | 395/147 |
| 5,423,043 | 6/1995 | Fitzpatrick et al. | 395/700 |
| 5,446,896 | 8/1995 | Hegarty et al. | 395/650 |
| 5,475,805 | 12/1995 | Murata | 395/145 |
| 5,479,601 | 12/1995 | Matheny et al. | 395/155 |
| 5,485,617 | 1/1996 | Stutz et al. | 395/700 |
| 5,495,565 | 2/1996 | Millard et al. | 395/147 |
| 5,499,333 | 3/1996 | Doudnikoff et al. | 395/153 |
| 5,517,605 | 5/1996 | Wolf | 395/155 |
| 5,517,645 | 5/1996 | Stutz et al. | 395/700 |
| 5,537,526 | 7/1996 | Anderson et al. | 395/148 |
| 5,572,648 | 11/1996 | Bibayan | 395/340 |
| 5,581,686 | 12/1996 | Koppolu et al. | 395/340 |

OTHER PUBLICATIONS

Brüning & Everth, *"RagTime 2,"* Brüning & Everth Softwarepartner GmbH, Heyden & Son Limited, London (1987).

Kraig Brockschmidt, *"Inside OLE 2,"* Microsoft Press, pp. 496–847, Redmond, WA (1994).

Unknown, *"ResEdit Reference for ResEdit Version 2.1,"* Apple Computer, Inc., Cupertino, CA.

Microsoft OLE 2.0 Design Team, *"OBJECT Linking Embedding, OLE 2.0 Design Specification,"* Microsoft Corp., CA (Apr. 15, 1993).

Unknown, *"Object Linking & Embedding,"* Programmer's Ref., Microsoft Corp., CA (1992–1993).

D.E. Lipkie, S.R. Evans, J.K. Newlin, and R.L. Weissman, *"Star Graphics: An Object–Oriented Implementation,"* Xerox Corp., CA, Computer Graphics, vol. 16, No. 3, Jul. 1982.

Robert Cowart, *"Mastering Windows™ 3.1,"* Sybex, Inc., Alameda, CA, pp. 7–17, (1992–1993).

D.C. Smith and J. Susser, *"A Component Architecture for Personal Computer Software,"* A Component Architecture for Personal Computer Software, CH. 3, pp. 31–56.

P. Zappacosta, *"Module–Based Software Integration: The Next Software Revolution,"* Logitech, Inc., Redwood City, CA, Sessions Presented at Wescon/84, (Oct.–Nov. 1984).

Colin Hunter, *"Software Components Stem Growing Costs,"* Electronic Product Design, (Mar. 1995).

H.L. Yudkin, *"Emerging Trends Present Opportunities, Challenges for Standards Development,"* Computerworld Extra, pp. 67–68, (Aug. 1988).

Michael Floyd, *"The Evolution of Component–Based Programming,"* Dr. Dobb's Journal (Jan. 1991).

J.A. Carter and J.B. Tubman, *"Integrated Software: Past, Present and Future,"* Future Computing Systems, vol. 2, No. 2 (1987).

Joseph A. Goguen, *"Reusing and Interconnecting Software Components,"* SRI International, Design for Adaptability, IEEE (1986).

D.Batory and D.Vasavada, *"Software Components for Object–Oriented Database Systems,"* Dept. of Computer Sciences, University of Texas, Austin, TX, pp. 2–27.

D.E. Liddle, *"The Constellation Project: A Vision of A New Software Marketplace,"* Metaphor Computer Systems.

Unknown, *"Viewpoint 1.0 Release Document,"* Xerox Corp., Palo Alto, CA, (1985).

Unknown, *"Services Programmer's Guide,"* Xerox Corp., Palo Alto, CA, (Sep. 1985).

Unknown, *"ViewPoint Programmer's Manual,"* Xerox Corp., Sunnyvale, CA, (Dec. 1986).

Steve Zurier, *"Users Cast Votes for 3.1; Grass–Roots Windows Movement Gathers Speed,"* Government Computer News, vol. 1, No. 15 (Jul. 1992).

Unknown, *"Implementing Implicit Drag Along Without Regard to Object Set Type,"* IBM Technical Disclosure Bulletin, vol. 27, No. 10A, p. 5518, (Mar. 1985) US.

Unknown, *"Common Editing Arrangement for Different Object Types in Text Processing,"* IBM Technical Disclosure Bulletin, vol. 27, No. 9, pp. 5049–5052, (Feb. 1985) US.

Unknown, *"Dragging Marked Data to an Editor Window,"* IBM Technical Disclosure Bulletin, vol. 34, No. 10B, pp. 202–203, (Mar. 1992) US.

Alan Simpson, *"Mastering Wordperfect 5.1 & 5.2 for Windows,"* Sybex, Inc., Alameda, CA (1992–1993).

Unknown, *"Microsoft Mail,"* User's Guide, Overview of Mail and the Outline Documentation, Ch. 1, Microsoft Corp., (1992).

ENHANCED COMPOUND DOCUMENT PROCESSING ARCHITECTURES AND METHODS THEREFOR

COPYRIGHT NOTICE

A portion of the disclosure of this patent document contains material which is subject to copyright protection. The owner has no objection to the facsimile reproduction by any one of the patent disclosure, as it appears in the Patent and Trademark Office patent files or records, but otherwise reserves all copyright rights whatsoever.

BACKGROUND OF THE INVENTION

The present invention relates generally to computer systems and to document processing systems in computers. More particularly, the present invention relates to improved apparatuses and methods for communicating attribute data between objects in a compound document in a computer.

Traditionally, documents are processed using stand-alone application programs. Each document in the application-centered approach typically utilizes a single application program to render and manipulate its data. Further, data within an application-centered document is homogenous throughout. By way of example, a text document typically contains only text and is rendered and manipulated by a word processor application program. In the application-centered world, if a computer user wants to create a graphics image, he or she would typically have to switch to a different document that is associated with, say a graphics application program.

In contrast, compound documents are documents whose contents are non-homogenous. A compound document may have within it different types of data, such as text, graphics, sound, or other types of data that are displayable or manipulable using a computer. Representative existing compound document architectures include OpenDoc™ by Apple Computer, Inc. of Cupertino, Calif. and OLE™ by Microsoft Corporation of Redmond, Wash.

Furthermore, a compound document embeds, or incorporates, multiple applications in a single compound document framework. Each application program so embedded is responsible for rendering and manipulating its associated data in a discrete content area of the compound document. As such, a computer user may move among the discrete content areas to use the respectively associated embedded applications to edit the compound document's non-homogeneous contents without having to switch documents. For this reason, many people find that compound documents are easy to work with.

To facilitate a discussion of compound documents, FIG. 1 shows a traditional compound document along with its various constituting elements. The compound document of FIG. 1 may be created by, for example, the aforementioned OpenDoc™ compound document software. Referring now to FIG. 1, there is shown a window 200 representing a window within which a compound document may be displayed and manipulated. As is well known to those of skill in the art, window 200 may include a menu bar 202 and a display area 204. There may optionally be provided a scroll bar 206 for permitting the computer user to scroll through different portions of the compound document.

Within display area 204 there is shown a root view of the compound document. In a compound document, the aforementioned different types of data, e.g., text, graphics, sound, and the like, co-exist within a document "container." The root view is a visual representation of these different types of data in the aforementioned compound document container.

Within the document container, a plurality of objects may be embedded, i.e., incorporated or contained. As the term is used herein, an object is defined as an area in a document that contains information or "content." Programs that manipulate object information are called object editors. Visual representations of objects on screen or in an electronic document are called data objects. In a typical compound document architecture objects may contain other objects in an embedding hierarchy, where the first object present in a document is referred to as the root object. Since the root object is an embedded object, it delineates the content area within which an intrinsic text content associated with the root object is rendered. An example of the intrinsic text content associated with the root object is illustrated in the sentence that reads: "This is a South American iguana."

To render and manipulate this intrinsic text content of the root object, there is associated with the root object a root object editor, also known as a root editing component, representing the underlying program that manipulates object content. In the example of FIG. 1, this root object editor is shown as object editor 214 and may be implemented by, for example, a word processor.

Besides the root object, the document container is further capable of embedding, i.e., incorporating, other objects. Each embedded object, whether or not a root object, delineates a discrete, mutually exclusive content area within the compound document. Content areas are mutually exclusive because each content area only contains one type of data. By way of example, there is shown in FIG. 1 an embedded object 208, which serves to delineate the content area of the compound document that is associated with a graphic image 210. Note that only graphics data is shown in the content area associated with embedded object 208. In contrast with the root object, which represents the first level of embedding in the document container, embedded object 208 represents a deeper level of embedding.

Each embedded object has associated with it an object editor, which is used for rendering and manipulating the content that is intrinsic to that embedded object. An example of an object editor, i.e., root object editor 214, has already been discussed in connection with the embedded root object. As a further example, object editor 216 of FIG. 1 may represent the graphics object editor associated with embedded object 208 for rendering and manipulating graphics image 210 within object 208. Object editor 216 may represent, for example, a simple drawing program.

In general, each object editor has a proprietary user interface, which is typically furnished by the developer of the application program code underlying that embedded object editor. The user interface represents, among other things, the overall "look" of the content area with which an object editor is associated, the manner in which the content is rendered, as well as the manner in which editing tools are implemented. The portion of the user interface for laying out the editing tools is referred to herein as a UI container since its role, be it a menu bar, a floating palette, a dialog box, or the like, is to provide an environment for implementing editing tools.

Within object 208 of FIG. 1, there is further embedded an object 212, representing a yet further level of embedding within the document container. Embedded object 208 serves to delineate the content area associated with the text content inside it. This text content is represented by, for example, the sentence in FIG. 1 that reads: "This is a text part." Embedded object 212 has associated with it object editor 218, which is used for rendering and manipulating the text content within embedded object 212. As is apparent in the relationship between the document container, the root object, object 208, and object 212, there could be multiple levels of embedding and deeply nested contents within a compound document.

It is typically not required for object editor 218 to be the same as object editor 214, i.e., it is not required that these two object editors utilize the same underlying program. By way of example, object editor 214 may represent one particular text editing program while object editor 218 may represent another text editing program. However, it is entirely permissible for both object editors 214 and 218 to be the same application program if such is desired by the computer user. For example, object editor 214 and object editor 218 may both implement the same word processor in different embedded objects. In this case, the object editor associated with the root view as well as embedded object 212 may both have pointers to the underlying application program, thereby enabling one application program to serve both of these embedded objects.

In the compound document architecture, the data representing the text content within the root view of display area 204, the graphics content within object 208, and the text content within object 212 may be stored within a single file object 220, which exists inside the computer's persistent storage system. For example, each of object editors 214, 216, and 218 may respectively store their associated data inside a respective section of file object 220. As the document is read from storage, the data of each section may be recalled from file object 220 and rendered in the compound document within window 200 by the object editor with which the stored data in each section is associated.

If an object editor is not available for recalling and rendering/manipulating the data stored in a section of file object 220, that data is simply not displayed and is not manipulable in the compound document. However that data still resides with the document and is not destroyed or corrupted. By way of example, this situation may occur when a document, which has been created on a first computer, is moved to a second computer which lacks the appropriate object editor to recall and render some of the data. When the compound document is activated by the second computer, the embedded object that delineates the content area associated with the missing object editor may still appear. However, the content inside that object is likely a static image. In some case, the static image may simply be a gray background.

Although the non-homogenous contents of a typical compound document may appear visually seamless, the typical compound document is in fact more like a collage of embedded objects, wherein each embedded object editor is in effect a separate application program within a document framework. The disjointed nature of the typical compound document is most clearly felt during an editing session. For example, when computer users move their selection from one content area of a typical compound document to another content area, say to manipulate different pieces of data, the effect may be similar to that observed when computer users switch among stand-alone applications in the application-centered approach in that the user interface changes. This is because in a compound document, an object editor does not operate in the content area with which it is not associated. For example, object editor 214, representing the text object editor for the intrinsic text content in the root object, typically does not get involved in rendering or manipulating the graphics images within object 208.

When a user changes object editors to manipulate different pieces of data, the user interface of the typical compound document may change completely and suddenly. This is because each object editor in the typical compound document implements its own user interface and furnishes its own set of tools with which its associated content is rendered and manipulated.

By way of example, if object editor 218 has a different user interface from that of object editor 216, the user interface will change when the computer user moves from editing the text content in embedded object 212 to editing graphics image 210 in embedded object 208. When the user interface changes, the old UI container and its editing tools are immediately replaced with a new UI container and new editing tools for editing the newly selected content. In some cases, the changes may occur suddenly and disorientingly. By way of example, sudden changes to the appearance of the traditional compound document may occur when the computer user moves from one object editor, say one having a UI container that lays out its editing tools in a red floating palette, to an object editor that lays out its editing tools in a blue menu bar.

Further, the fact that an object editor, its editing tools, and its UI container are interdependent on one another in a typical compound document also presents other problems. For one, this fact adversely impacts modularity of design and makes global changes difficult to implement. Consider the situation where a computer user wishes to globally change the pen width of all drawing tools in a compound document that employs, say five different graphics object editors. It is not possible to effect such global changes in one operation in the traditional compound document architecture since each object editor exclusively "owns" its editing tools. Therefore, the computer user must change the pen width tool provided with each object editor, i.e., make five changes, in order to accomplish this task.

In a commonly-assigned, co-pending patent application entitled "Methods and Apparatuses for Seamless Compound Document Processing" U.S. Ser. No. 08/441,946, now U.S. Pat. No. 5,664,208, filed on even date and incorporated by reference herein for all purposes, an inventive enhanced compound document processor (ECDP) architecture is disclosed. In the aforementioned patent application, embedded objects in an enhanced compound document assume specific functional roles relative to one another.

To ensure that objects work together to render and edit contents, there is provided a communication system which utilizes one or more data structures known as auditor data structures to permit object editors and editing controllers of the enhanced compound document to communicate attribute data. Attributes are descriptions of a particular selection of a content. Attributes of data include, for example, text font and text styles, if the selection is made in a text data content area. If the selection is made in a graphics data content area, attributes may include, for example, fill color and pen width.

For example, it is discussed extensively therein that an object editor and an editing controller interested in a like type of data, e.g., text, may use a text auditor data structure to communicate text attributes of a text selection. It is also discussed therein that, for example, a graphics object editor and an editing controller interested in graphics may use a graphics auditor data structure to communicate graphics attributes regarding a selected graphics image. For further information regarding object editors and editing controllers and their functional roles in an enhanced compound document, reference may be made to the aforementioned disclosure.

While the ECDP architecture described in the above-mentioned patent application represents a significant advance in the art, it is recognized, however, that additional advantages may be obtained when a data structure, known as an auditor data structure, is utilized for communication among the embedded objects, such as the object editors and the editing controllers of a compound document. An auditor data structure is a data structure which is capable of describing the attributes of a selected portion of content data to enable other embedded objects having access to that auditor data structure to decipher the attributes contained therein.

It is also recognized that additional advantages may accrue when a generic auditor data structure is utilized for communication among the embedded objects. A generic auditor data structure is a data structure which can be used to generically represent the attributes of data, be it text, graphics, sound, or any other data displayable or manipulable using a computer. The recognition of the additional advantages associated with generic auditor data structures is partly a result of the realization that for any embedded object editor to communicate with any editing controller in an enhanced compound document and vice versa, it is important to provide a mechanism whereby attribute data may be understood by both. More importantly, it is preferable that this mechanism can facilitate such communication at run time although these embedded objects may not know in advance, i.e., prior to their being embedded in an existing document, how data is structured in the other embedded objects.

When any object editor can communicate with any editing controller and vice versa, great flexibility in the configuration of the resulting enhanced compound document may be realized. It is recognized that if any object editor may communicate with any editing controller upon being embedded in a document, the user may put together an ECDP document by simply embedding the desired object editors (content rendering engines) at desired locations in a compound document as well as their favorite set of editing controllers (editing tools). Most significantly, the creation of such a compound document may be done dynamically during an editing session without requiring advance knowledge of how data is structured, i.e., the content models, any of the embedded objects.

In view of the aforementioned recognition of the advantages associated with auditor data structures, what is desired is an improved method and apparatus for communicating attribute data among embedded objects in a compound document. The improved method and apparatus preferably permit embedded objects, such as object editors and editing controllers to communicate attribute information associated with a selected portion of content data without requiring advance knowledge of the content models of the object editors.

SUMMARY OF THE INVENTION

The invention relates to an enhanced compound document architecture in which objects, such as object editors (content rendering engines) and editing controllers (editing tools), from different sources may be embedded in a single compound document framework to facilitate editing of the document contents. In general, each object editor is responsible for rendering and manipulating content data of a single type, e.g., text, graphics, or the like, in a discrete data content area of the document.

Through the use of an appropriate data structure, known as an auditor data structure, embedded objects, such as the aforementioned object editors and editing controllers, may advantageously communicate among one another to permit a user, through appropriate manipulations of controls associated with editing controllers, to edit a selected data portion of the compound document.

The communication takes place using the auditor data structure as a communication medium although some or all of these embedded objects may not know about how data is structured in other objects. This is because communication takes place using the data fields of the auditor data structure as a communication medium instead of directly among the embedded objects. In this manner, auditor data structures permit a compound document to be flexibly created using object editors and editing controllers from a variety of sources. In some instances, all that is required to create a compound document is for the users to embed the appropriate object editors and their favorite editing controller tools, and the inventive enhanced compound document architecture would ensure that these embedded objects communicate appropriately to achieve the user's editing goals.

Furthermore, and perhaps more importantly, the fact that editing controllers (editing tools) are associated with the entire document and not with each object editor (content rendering engine) permits document designers to present a consistent editing context, i.e., the look of the compound document during an editing session, to the user regardless of which object editor is currently in charge. This is in contrast to existing compound document architectures in which the editing context changes during an editing session as the user switches among object editors.

The invention relates, in one embodiment, to a compound document in a computer. The inventive compound document includes a first embedded object editor, which is used for rendering data in a first data content area of the compound document. The inventive compound document also includes a second embedded object editor for rendering data in a second data content area. In accordance with one aspect of the present invention, data in the first data content area and data in the second data content area may represent two different types of data, e.g., graphics and text, and still can co-exist in one compound document. Further, the first data content area and the second data content area are mutually exclusive. For example, each data content area is used to render only the content with which it is associated. Text content would not be rendered in a graphics content area and vice versa.

The inventive compound document further advantageously includes a plurality of editing controllers, which are embedded in the compound document. The editing controllers are advantageously employed to edit attributes of a selection of either the first data or the second data. Furthermore, there is included a data structure, known as an auditor data structure to represent attributes relating to the aforementioned selection of data. As mentioned earlier, attributes are descriptions of a selection of a content.

Further, the auditor data structure of the present embodiment advantageously includes data fields for representing the aforementioned attributes. The data fields are decipherable by selected ones of the editing controllers and at least one of the first object editor and the second object editor. In this manner, communication of attributes of a content selection in a data content area may be accomplished using the data fields of the auditor data structure as a communication medium. Selective editing controllers may wish to communicate with selective object editors to, for example, receive attribute data, thereby permitting a computer user to edit the attributes using controls associated with the editing controllers. Similarly, selective object editors may wish to communicate with the editing controllers to, for example, receive the changed attribute data to render it on a display screen.

To further facilitate communication between the object editors and the editing controllers, the inventive compound document further includes a data switching system for passing the first auditor data structure between the editing controllers and the first and second object editors. In accordance with one aspect of the present invention, the data switching system determines which one(s) of the plurality of editing controllers receive the auditor data structure. In one embodiment, this determination is made based on interest registered by each editing controller with the data switching system. For example, some editing controllers may register their interest in receiving text attributes while others may register their interest in receiving graphics attributes. Using this registration data, the data switching system may advantageously match the interest of each editing controller with the attributes to be passed to determine the correct destination editing controller(s).

In another embodiment, the invention relates to a method for communicating attribute data between a plurality of object editors and a plurality of editing controllers in a compound document. The inventive method advantageously includes the step of selecting a data structure, known as an auditor data structure, to represent attributes of a selection in one of the content areas of the compound document. The invention further includes the step of filling out data fields of the auditor data structure with data relating to the first attributes using an object editor associated with one of the content areas.

The inventive method also includes the steps of communicating the first attributes from the object editor to a data switching system using the auditor data structure, and communicating the first attributes, using the auditor data structure, from the data switching system to selective editing controllers. In one embodiment, the data switching system advantageously bases its determination on interest associated with editing controllers to ascertain which editing controller(s) receive the auditor data structure.

In yet another embodiment, the invention relates to a computer program product, which includes a computer usable medium having computer readable code embodied therein for processing data in a compound document. In accordance with this embodiment, the compound document includes a plurality of embedded object editors for respectively rendering data having different interest types in different compound document content areas. The compound document further includes a plurality of editing controllers embedded in the compound document.

The inventive computer program product advantageously includes computer readable program code configured to cause a computer to detect whether a selection is made in one of the data. Furthermore, there is included computer readable program code configured to cause the computer to effect the filling out of an auditor data structure with attributes of the selection by the object editor that is associated with the data in which the selection is made.

Further, the inventive computer program product includes computer readable program code configured to cause the computer to communicate the attributes embodied in data fields of the auditor data structure from the above-mentioned object editor to selective interested ones of the editing controllers. In one embodiment, both the above-mentioned object editor and the interested editing controllers register with a data switching system to receive attribute data having an interest represented by the attributes of the aforementioned selection.

BRIEF DESCRIPTION OF THE DRAWINGS

Additional advantages of the invention will become apparent upon reading the following detailed description and upon reference to the drawings, in which.

DESCRIPTION OF THE PREFERRED EMBODIMENT

It should be noted that the invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, windows, workspace, objects, or the like. It should be remembered, however, that all of these and similar terms are to be associated with the appropriate physical quantities and are merely convenient labels applied to these quantities.

Further, the manipulations performed are often referred to in terms, such as identifying, selecting, dragging, or dropping, transmitting, and the like. In any of the operations described herein that form part of the present invention, these operations are machine operations. Useful machines for performing the operations of the present invention include general purpose digital computers or other similar devices. Alternatively and equivalently, such manipulations may be partially or wholly provided in hardware logic, as will be appreciated by those skilled in the art.

Figure 1:
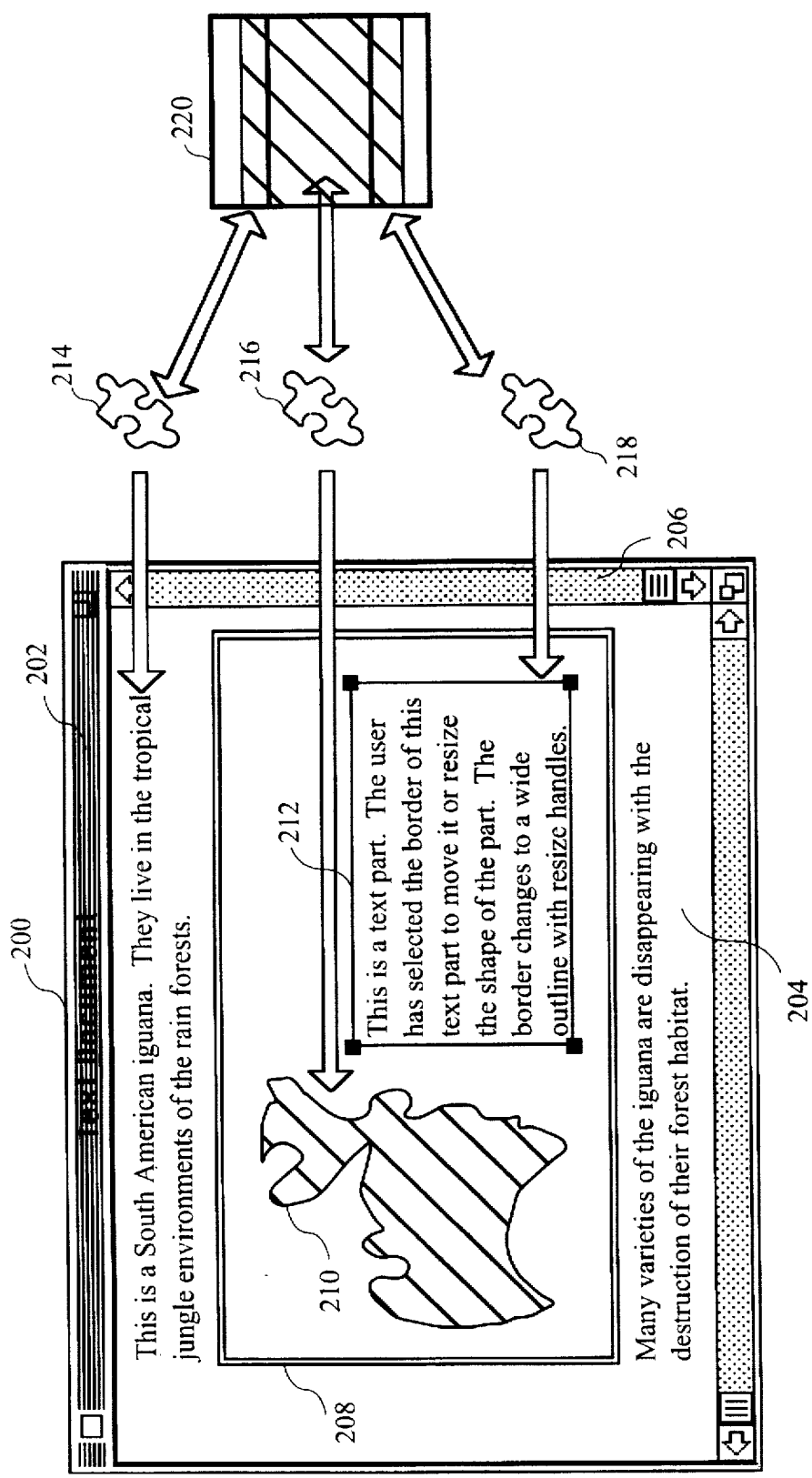
FIG. 1 shows a traditional compound document along with its various constituting elements.
Figure 2:
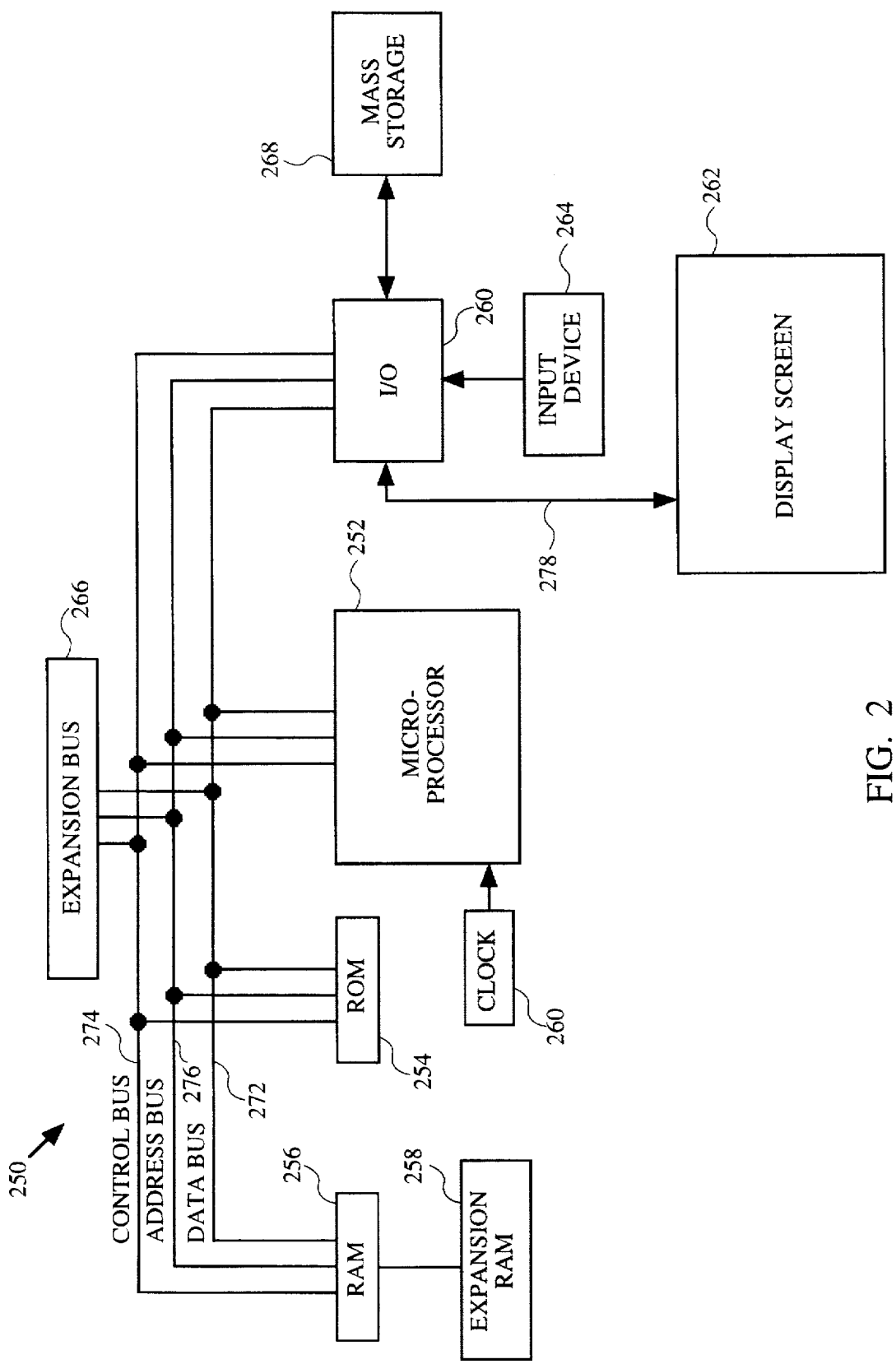
FIG. 2 shows a general purpose computer system for implementing the present inventive method.

In FIG. 1, a compound document is illustrated to facilitate the earlier discussion of compound documents. FIG. 2 shows a general purpose computer system for implementing the present inventive method. Referring to FIG. 2, a computer system 250 in accordance with the present invention includes a central processing unit (CPU) 252, read only memory (ROM) 254, random access memory (RAM) 256, expansion RAM 258, input/output (I/O) circuitry 260, display assembly 262, input device 264, and expansion bus 266. Computer system 250 may also optionally include a mass storage unit 268 such as a disk drive unit or nonvolatile memory such as flash memory and a real-time clock 260. In one embodiment, mass storage unit 268 may include units which utilizes removable computer readable media, such as floppy disks, optomagnetic media, optical media, and the like for the storage of programs and data.

CPU 252 is preferably a commercially available, single chip microprocessor such as one of the Intel X86 or Motorola 680XX family of chips, or a reduced instruction set computer (RISC) chip such as the PowerPC™ microprocessor available from Motorola, Inc. CPU 252 is coupled to ROM 254 by a data bus 272, control bus 274, and address bus 276. ROM 254 may partially contain the basic operating system for the computer system 250. CPU 252 is also connected to RAM 256 by busses 272, 274, and 276 to permit the use of RAM 256 as scratch pad memory. Expansion RAM 258 is optionally coupled to RAM 256 for use by CPU 252. CPU 252 is also coupled to the I/O circuitry 260 by data bus 272, control bus 274, and address bus 276 to permit data transfers with peripheral devices.

I/O circuitry 260 typically includes a number of latches, registers and direct memory access (DMA) controllers. The purpose of I/O circuitry 260 is to provide an interface between CPU 252 and such peripheral devices as display assembly 262, input device 264, and mass storage 268. Display assembly 262 of computer system 250 is an output device for displaying objects and other visual representations of data.

The screen for display assembly 262 can be a device that uses a cathode-ray tube (CRT), liquid crystal display (LCD), or the like, of the types commercially available from a variety of manufacturers. Input device 264 can be a keyboard, a mouse, a stylus working in cooperation with a position-sensing display, or the like. Alternatively, input device can be an embedded RF digitizer activated by an "active" RF stylus. Therefore, as used herein, the term input device will refer to any mechanism or device for entering data and/or pointing to a particular location on a screen of a computer display. The aforementioned input devices are available from a variety of vendors and are well known in the art.

Some type of mass storage 268 is generally considered desirable. However, mass storage 268 can be eliminated by providing a sufficient amount of RAM 256 and expansion RAM 258 to store user application programs and data. In that case, RAMs 256 and 258 can optionally be provided with a backup battery to prevent the loss of data even when computer system 250 is turned off. However, it is generally desirable to have some type of long term mass storage 268 such as a commercially available hard disk drive, nonvolatile memory such as flash memory, battery backed RAM, PC-data cards, or the like.

In operation, information is inputted into the computer system 250 by typing on a keyboard, manipulating a mouse or trackball, or "writing" on a tablet or on a position-sensing screen (not shown) associated with display assembly 262. CPU 252 then processes the data under control of an operating system and an application program stored in ROM 254 and/or RAM 256. CPU 252 then typically produces data which is outputted to the display assembly 262 to produce appropriate images on its screen.

Expansion bus 266 is coupled to data bus 272, control bus 274, and address bus 276. Expansion bus 266 provides extra ports to couple devices such as modems, display switches, microphones, speakers, etc. to CPU 252.

The above-discussed computer represents, in one embodiment, the apparatus suitable for use in creating and editing the improved compound document. The inventive enhanced compound document processor (ECDP) will now be discussed in details.

In contrast with the application-centered approach or the traditional document-centered approach, a compound document created in accordance with the inventive enhanced compound document processor (ECDP) technique comprises embedded objects which have distinct functional roles relative to other embedded objects. For further information regarding the functional roles of embedded objects, reference may be made to a commonly-assigned, co-pending patent application entitled "Methods and Apparatuses for Seamless Compound Document Processing" U.S. Ser. No. 08/441,946, now U.S. Pat. No. 5,664,208, filed on even date and incorporated by reference herein for all purposes.

In accordance with the ECDP approach, there are primarily three types of embedded objects: provider, patron, and editing controllers (EC's). Each compound document includes a provider, which functions as the root object of the compound document. There is typically only one provider per compound document. The provider represents an embedded object editor, also known as a component editor or an editor object, for rendering and manipulating contents that are intrinsic to the provider. As the term is used herein, rendering is typically, but not necessarily done in a visual manner on a display screen. Examples of non-visual contents which may be rendered by an object editor includes, for example, sound data. As a further example, contents may be rendered to memory instead of to the display screen. Further, contents are considered intrinsic to an object editor if that object editor is primarily responsible for rendering and manipulating the contents.

Further, a provider may embed other object editors, each of which is also capable of rendering and manipulating its own intrinsic contents. An object editor that is embedded in a provider is known herein as a patron. By way of example, a provider representing a text object editor may have embedded in it one or more graphics object editors. The text object editor may then be responsible for rendering and manipulating its intrinsic text data while a graphics object editor embedded therein may be responsible for rendering and manipulating its own intrinsic graphics images.

In one embodiment, embedding of an object, such as an object editor or an editing controller, is preferably accomplished by a drag-and-drop operation using a screen pointer device such as a mouse, a trackball, a trackpad, or the like. In another embodiment, embedding may be accomplished by specifying via a keyboard command or a menu selection of the object that the user desires to embed in a compound document.

In the inventive ECDP architecture, the provider also represents the part which is responsible for implementing the user interface (UI) strategy for the entire compound document. This is in contrast to the traditional document-centered architecture, such as OpenDoc™ by Apple Computer, Inc. of Cupertino, Calif. or OLE by Microsoft, Inc. of Redmond, Wash., in which each embedded object is responsible for managing its own user interface. The provider in an ECDP document preferably implements the UI strategy for the entire compound document by managing a UI container, which is associated with the provider. Examples of UI containers include floating palettes, menu bars, dialog boxes, icons, and the like. It should be noted that although only one UI container is discussed herein in details for ease of discussion, an ECDP document may be associated with multiple UI containers, each of which may have a different theme or shape. In contrast to traditional document-centered approaches, however, the inventive ECDP document preferably does not provide a separate UI container for each application program that is embedded in the compound document. Instead, different object editors in an ECDP document, whether a provider or a patron, share the aforementioned UI container and a pool of attribute editing tools known as editing controllers (herein "EC").

Editing controllers represent another type of embedded object in an ECDP document and are the tools for changing the attributes of the ECDP document contents. The UI container is the primary environment for laying out and presenting editing controllers (EC's) to the computer user. By way of example, an EC implemented in a container may be, in one embodiment, a button for changing text font size in a floating palette.

Since the provider manages the UI strategy of the entire compound document by managing the UI container with which it is associated, an ECDP document advantageously maintains a consistent, monolithic look and feel during an editing session. To the extent possible, the UI container and its EC's preferably remain consistent regardless which object editor is currently active, i.e., the current focus of user operation. In this manner, when a computer user changes object editors, e.g., by moving from one content area to another content area, the UI container and its EC's, as well as the editing context in general, preferably remain consistent. The fact that the editing context remains substantially consistent irrespective of which object editor is the current focus of user operation represents an important aspect of the present invention.

In contrast, compound documents created in accordance with the traditional document-centered approach requires that each embedded object provide its own user interface and furnish its own set of tools. The resulting compound document created using the traditional document-centered approach is therefore more like a collage of objects instead of giving the look and feel of one unified document. For example, if a computer user moves from one content area to another content area in a traditional compound document, the editing context, e.g., the user interface and the set of tools, may change suddenly, significantly, and possibly disorientingly. By way of example, it is not unusual for the entire editing context, including the color scheme and tool set to completely change (e.g., from red floating palette to grey menu bar) when a computer user moves from one embedded object to another embedded object in a traditional compound document.

An ECDP document advantageously maintains a consistent, monolithic look and feel during an editing session since the user interface is managed by a single entity, i.e., the provider. To further enhance the monolithic, consistent look-and-feel experience, the provider, in another aspect of the invention, may offer an application programming interface (API) for enforcing integration of user interface regarding the look of an ECDP document.

By way of example, a provider may specify that the preferred look of a particular ECDP document, say a children drawing program, should include certain color and shading scheme. Other embedded objects with multiple options for presenting themselves may then use the API established by the provider to conform the rendered embedded objects to the overall look of the document. Developers of future add-on embedded objects may also use the promulgated API to ensure that their add-on embedded objects are visually harmonious with an existing ECDP document.

In accordance with the inventive ECDP approach, object editors and EC's are decoupled. In other words, an object editor and the tools which are used to edit the attributes of its content are no longer exclusively interrelated. Many object editors can and are expected to share the same editing controllers (EC's) and vice-versa. Because object editors and EC's are completely decoupled, it is possible to keep the same set of EC's in a UI container when a computer user moves from object editor to object editor. Necessarily, there are times when a certain EC cannot edit the currently selected content. For example, when a computer user moves from a graphics object editor, say a drawing program, to a text object editor, say a word processor, and clicks on a text phrase, EC's for changing the fill color of a graphics image may no longer be applicable. If they are kept in the UI container for visual consistency, these EC's may, in one embodiment, be dimmed.

Figure 3:
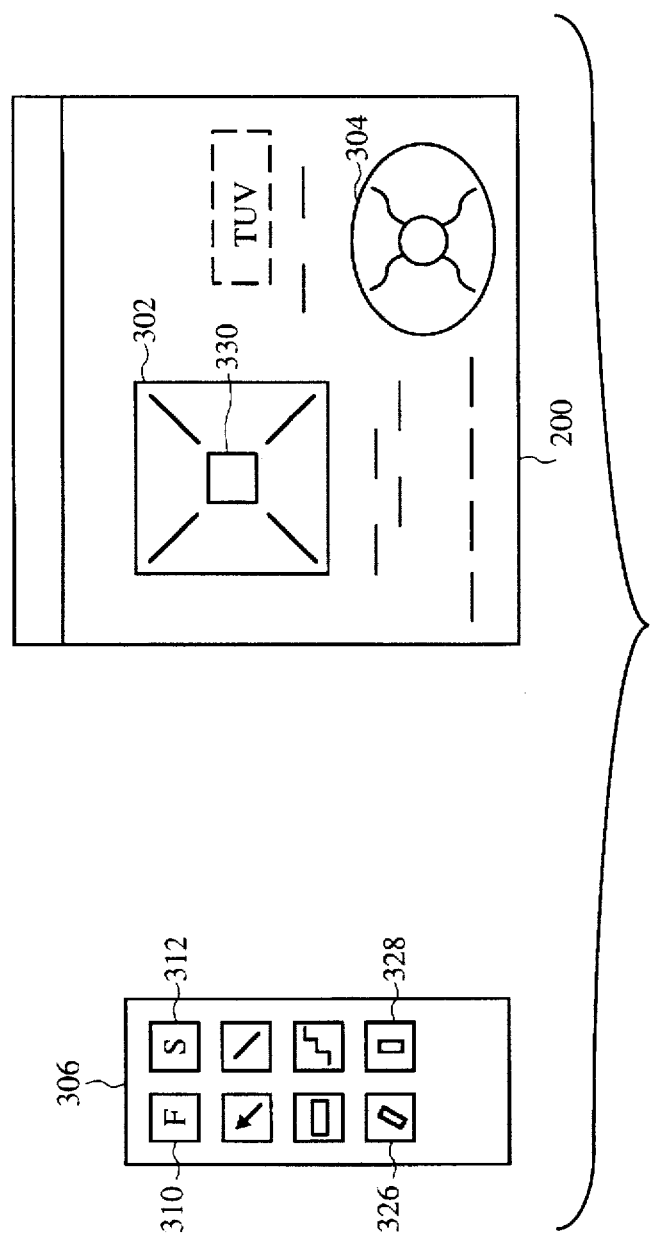
FIG. 3 shows a compound document created in accordance with one aspect of the inventive enhanced compound document processor (ECDP) technique.

FIG. 3 shows in a visual display format a compound document created in accordance with one aspect of the inventive enhanced compound document processor (ECDP) technique. Referring now to FIG. 3, there is shown a window 200 within an ECDP document may reside. In the implementation shown in FIG. 3, the boundaries of window 200 also serve as an object of an embedded object editor that functions as the provider. By way of example, the provider may be a text object editor for rendering and manipulating the intrinsic text content. A portion of the text content which is intrinsic to the provider is shown by the letters "T U V" in window 200.

There is also shown in FIG. 3 an embedded object 302, delineating the content area of an embedded graphics object editor. The graphics object editor associated with object 302 may be used to, for example, render and manipulate the graphical content within object 302. FIG. 3 also shows an object 304, which delineates the content area associated with another graphics object editor. The graphics object editor associated with object 304 may be used to, for example, render and manipulate the graphical content within object 304.

Note that although only two embedded objects are shown in FIG. 3 for illustration purposes, a provider may have embedded in it any number of embedded objects. Further, a provider may even have no embedded objects. Further, there is no requirement that two embedded objects must implement the same object editor. For example, although objects 302 and 304 both implement graphics object editors, the graphics object editor associated with object 302 may be a different application program than the graphics object editor associated with object 304.

As mentioned earlier, each object editor of an ECDP document, e.g., the provider associated with window 200, the graphics patron associated with object 302, and the graphics patron associated with object 304, do not have individual user interfaces. Instead, there is one user interface per ECDP document, which is managed by the provider. All object editors further share a common pool of attribute editing controllers (EC's), subsets of which are displayed in a UI container for use by the computer user at any given point in time.

There is also shown in FIG. 3 a UI container 306. As mentioned earlier, the UI container is associated with the provider of the ECDP document and represents the environment within which EC's are implemented and displayed. In the example of FIG. 3, EC's in UI container 306 are implemented as a set of buttons for editing attributes of selected content within the ECDP document.

Depending on the goal of the ECDP document, UI container 306 may be furnished to the user as a fully populated tool set by a software developer. In accordance with one aspect of the present invention, however, UI container 306 may be populated by the computer user with individual EC's or sets of EC's that may be appropriate for the task which the computer user tries to accomplish. In this manner, a UI container implemented in accordance with the inventive ECDP technique may be highly configurable for performing a specific task. Note that EC's within the UI container of the inventive ECDP document preferably works with a wide range of embedded object editors. This is possible because the EC's within UI container 306 are completely decoupled from the object editors that utilize them for rendering and manipulating content.

In accordance with one aspect of the present invention, an EC and an object editor communicate according to interest types. In other words, when a portion of the content is selected, the attributes regarding that selection is received by and acted upon only by EC's that are interested in the interest type of the selection. Conversely, when an EC is manipulated to edit the attributes of a selection in an ECDP document, only those object editors that have an interest in the same interest type as the EC receive the changed attribute information. Upon receiving the changed attribute information, an object editor may, for example, render the changed attribute in its selection if appropriate.

In one embodiment, if an EC is displayed in UI container 306 but is deemed uninterested in a particular set of attribute information from a selection, that EC may dim out to indicate to the computer user that it is not available for use in editing the attributes of the selected content. By way of example, when the phrase "T U V" is selected in the root object (which is rendered and manipulated by the object editor which acts as a provider), EC buttons in UI container 306 that are responsible for changing font size and text styles may be interested and indicate themselves to be available for use. In one embodiment, EC's indicate themselves to be available by simulating the "pop up" state of buttons. Conversely, EC buttons in UI container 306 which are provided for changing the fill color of a graphics image may be uninterested and dimmed out. In this case, the font size EC 310 and text style EC 312 are deemed "active." On the other hand, pen color EC 326 and fill color EC 328 are deemed uninterested and inactive since EC's 326 and 328 are incapable of manipulating the selected text content. Additional information regarding behaviors of EC's when active and inactive, reference may be made to, for example, a publication entitled "Macintosh Human Interface Guidelines" (Addison-Wesley Publishing Company, 1992) or a similar publication entitled "Microsoft Windows Software Development Kit; The Windows Interface: An Application Design Guide" (Microsoft Corporation, Redmond, Wash., 1992), both of which are incorporated herein by reference for all purposes.

To further elaborate on the responses of EC's when a portion of the content is selected, consider the situation when a graphics image 330 embedded in object 302 is selected as a target of user operation. When graphics image 330 is selected, the graphics object editor associated with object 302 becomes the object editor that is the focus of user operation. If the computer user has moved from the previously selected text "T U V" to graphics image 330, the user has effectively moved across object editors, i.e., from a text object editor to a graphics object editor.

In the traditional document-centered approach, the movement across object editors most certainly result in the invocation of a different user interface and a different set of tools. This is because each object editor in the traditional document-centered approach exclusively manages its own user interfaces and exclusively employs its own set of tools for manipulating its content. There is no mechanism in the traditional document-centered architecture for robustly permitting object editors to share editing tools.

In contrast, UI container 306 in the ECDP document implemented using the inventive ECDP approach preferably remains substantially the same when the computer user moves his or her selection from one object editor to another object editor. Although some EC's may dim out and/or other EC's may be substituted in, it is preferable that the user interface and much of UI container 306 remain consistent across object editors.

Figure 4:
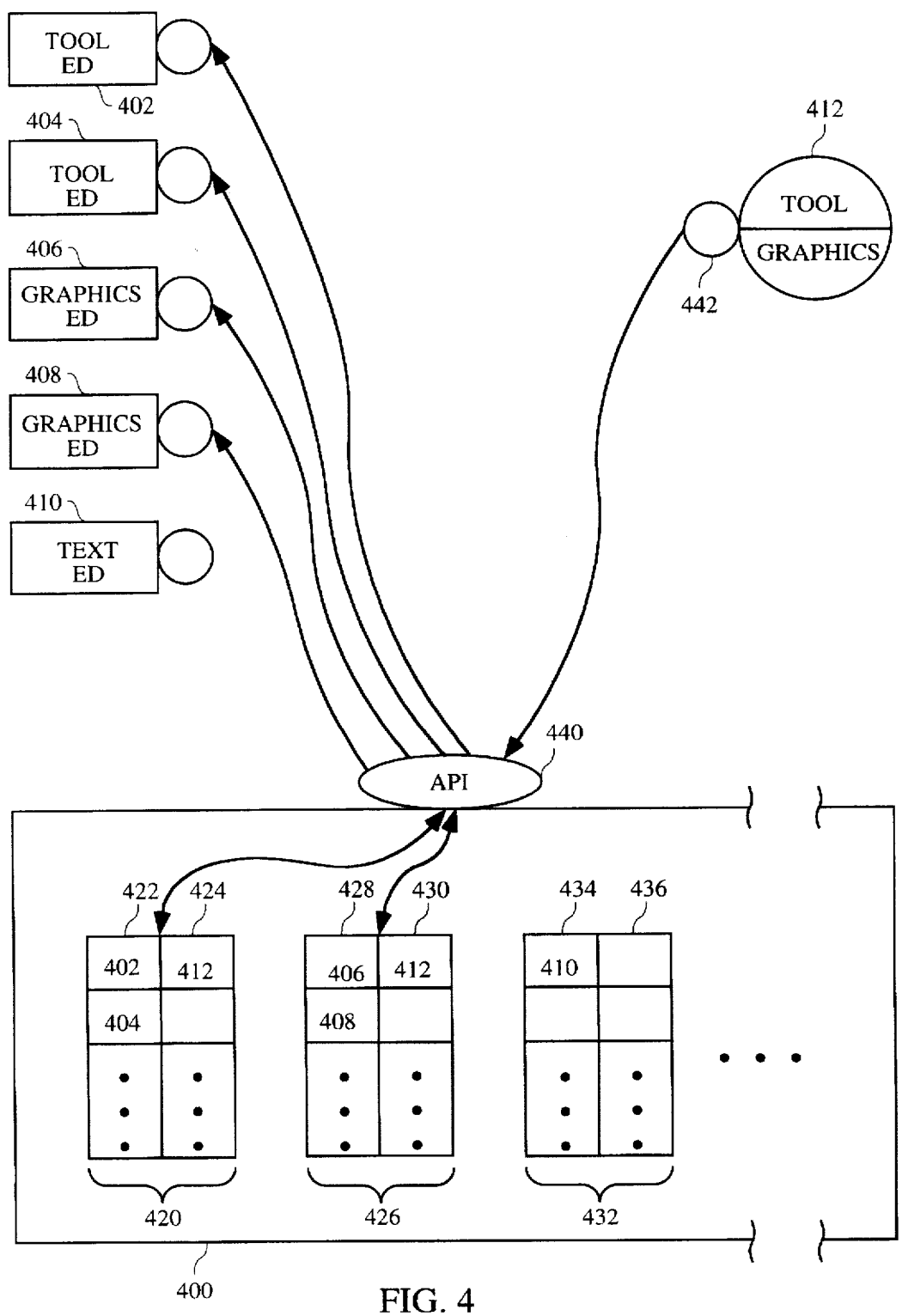
FIG. 4 is a diagram illustrating the communication paths between a data switching system, a tool editing controllers, graphics editing controllers, a text editing controller, and a graphics object editor when interested editing controllers are updated with the attributes data of the selected content.

When a portion of the content is selected, the attributes of the selected content are preferably communicated to EC's that have expressed interest in receiving information regarding those attributes for updating themselves. FIG. 4 is a diagram illustrating the communication paths between a data switching system 400, tool EC's 402 and 404, graphics EC's 406 and 408, a text EC 410, and a graphics object editor 412 when interested EC's are updated with the attributes data of the selected content. Referring now to FIG. 4, there is shown a graphics object editor 412. In one embodiment, graphics object editor 412 represents a simple graphics object editor, e.g., a simple drawing program, that has an interest in tools and graphics. FIG. 4 also shows a data switching system 400 having a plurality of lists of interest. For simplicity of illustration, only three lists are shown. It should be understood, however, that a data switching system of the inventive ECDP architecture may include any number of lists of interest.

In one embodiment, a list of interest represents a mechanism by which communication between object editors and EC's may be made more efficient. By using lists of interest, it is not necessary for an object editor to communicate to every EC every time a selection is made in the object editor. Instead, attribute data related to the selected content from the object editor that is the focus of user operation is sent only to EC's that have expressed their interest in receiving and responding to attribute data of the particular selection interest. For example, if a given EC is not interested in tools, attribute data relating to tools will not be received by and acted upon by that EC.

It should be noted that although data switching system 400, in one embodiment, facilitates communication between object editors and EC's in accordance with their interest types, it is possible, in one embodiment, to communicate by a simple broadcast mechanism whereby every object editor would communicate with every EC when a selection is made. Conversely, when controls within an EC is manipulated to edit the attribute data of a selection, it is possible to simply broadcast the changed attributes to all object editors for updating. Further, it is contemplated that data switching system 400 may, in some specific implementation, communicate using "keys" other than interests to improve communication efficiency.

In one embodiment, tool-interested objects roster 420 includes two lists: an tool-interested EC list 422 and a tool-interested object editor list 424. Tool-interested EC list 422 keeps track of the EC's that have expressed interest in receiving and responding to attribute data relating to tools. Similarly, tool-interested object editor list 424 keeps track of the object editors that are interested in receiving and responding to attribute data relating to tools. By way of example, when the computer user changes his or her drawing tool, say from a rectangle drawing tool to a free-hand drawing tool, this change may be reflected in the tool attribute data of the graphics object editor that is the focus of user operation.

Data switching system 400 further includes a graphics-interested objects roster 426. Graphics-interested objects roster 426 keeps track of the EC's and the object editors that are interested in attribute data relating graphics (in graphics-interested EC list 428 and graphics-interested object editor list 430, respectively). Similarly, data switching system 400 also includes a text-interested objects roster 432 for keeping track of the EC's and object editors having an interest in attribute data relating to text (in text-interested EC list 434 and text-interested object editor list 436, respectively).

To express its interest in a particular interest type, i.e. in attribute data relating to a particular interest, an EC or an object editor may register itself with data switching system 400. In the example of FIG. 4, EC 402 is a tool editing controller that is interested in receiving and responding to attribute data relating to the tool interest. Upon being embedded, EC 402 may register its interest with data switching system 400. Data switching system 400 then keeps track of this registered EC 402 in tool-interested EC list 422. As a further example, graphics object editor 412, representing a graphics object editor which is interested in receiving and responding to attribute data relating to graphics, may register its interest with data switching system 400 upon being embedded. Data switching system 400 then keeps track of graphics object editor 412 in graphics-interested object editor list 430.

Data switching system 400 further includes an application programming interface (API) 440 for communicating with graphics object editor 412 and EC's 402–410. In one embodiment, graphics object editor 412 has a pointer to API 440 to facilitate the passing of data between graphics object editor 412 and data switching system 400. When a selection of the intrinsic content is made in graphics object editor 412, the attribute data relating to graphics state of the selection and the tool state of the graphics object editor is then sent to the interested EC's for updating.

The communication between graphics object editor 412 and interested EC's may best be described in connection with a specific example. Consider the situation where a computer user, using a rectangle drawing tool, has just finished sketching a rectangle in graphics object editor 412. Immediately after the rectangle is sketched, the screen pointer, being done with sketching the rectangle, may change into the default pointing tool to permit the computer user to move and place the newly created rectangle in the ECDP document where it is needed.

When the screen pointer changes from a rectangle drawing tool to a pointing tool, graphics object editor 412 needs to update interested EC's that the current active tool has changed from a rectangle sketching tool to a pointing tool. In this case, graphics object editor 412 preferably fills out a data structure for describing tool attributes, referred herein as a tool auditor data structure, and sends this filled-out tool auditor data structure to data switching system 400. An auditor data structure preferably represents a data structure whose contents are understood by both the object editor and the EC's.

In accordance with one aspect of the present invention, communication between graphics object editor 412 and data switching system 400 is performed via an object editor extension 442. In one embodiment, object editor extension 442 itself is responsible for filling out the contents of the auditor data structure when the object editor with which it is associated wishes to communicate with data switching system 400. However, it is contemplated that in one embodiment object editor extension 442 and graphics object editor 412 may be created as a single unit instead of two separate units.

Each of EC's 402–408 may, in one embodiment, further includes a respective extension unit for communicating with data switching system 400 and implement the functionalities of the ECDP. Extensions are provided with EC's and object editors when, for example, the ECDP is implemented on top of a compound document architecture that has already provided unenhanced EC's and object editors.

After being filled out, the tool auditor data structure is sent to data switching system 400 and received therein via an optional Application Programming Interface (API) 440. Optional API 440 is associated with data switching system 400 to facilitate efficient communication between data switching system 400 and the object editors/EC's of the ECDP document. Note that data switching system 400 is capable of facilitating communication between EC's and all object editors, whether provider or patron, because a provider, as mentioned earlier, is essentially an object editor that is capable of embedding other object editors.

Since the auditor data structure received from object editor 412 is related to tool attribute data, data switching system 400 consults tool-interested objects roster 420 to ascertain the EC's that have registered their interest in receiving and responding to attribute data relating to tools. By consulting tool-interested objects roster 420, data switching system 400 may determine, for example, that tool EC's 402 and 404 have both expressed their interest in tool attribute data. In the example above, EC 402 may represent a rectangle sketching tool, and EC 404 may represent a pointing tool.

After it is ascertained that EC's 402 and 404 are the EC's that have expressed their interest in receiving attribute data relating to tool interest, data switching system 400 then sends the tool auditor data structure received earlier from graphics object editor 412 to both EC 402 and EC 404. EC 402, representing the rectangle sketching tool, determines from the data of the received tool auditor data structure that EC 402 is no longer the active tool. In one embodiment, EC 402 then responds by dimming itself to indicate its status as being no longer active. On the other hand, EC 404, representing a pointing tool, may determine after examining the data of the received tool auditor data structure, that it is now the active EC. In one embodiment, EC 404 may indicate its active status by visually "popping up."

When an auditor data structure is passed from an object editor to the data switching system, e.g., from graphics object editor 412 to data switching system 400, and then to the interested EC's, the auditor data structure may be passed by value. In other words, an EC and an object editor may copy the contents of an auditor data structure from one another. In one embodiment, however, the passing of an auditor data structure between object editors and EC's is performed through a technique known as passing by reference. When passed by reference, EC's and object editors may have a reference to the auditor data structure, thereby obviating the need to store multiple copies of the same auditor data structure in the computer memory space and reducing the time it takes to recopy the data of the auditor data structure. In one embodiment, the reference may be as simple as a pointer to the address in the memory space of the auditor data structure.

Note that in the above example, EC's 406, 408, and 410, not having registered their interest earlier with tool-interested objects roster 420, do not receive from data switching system 400 the tool auditor data structure which contains the changed tool attribute data.

Following the change in drawing tools, the computer user or the program itself may have indicated a selection. For example, when the drawing tool changes from a rectangle drawing tool to the pointing tool, the recently rendered rectangle may be automatically selected for operation. In this case, it is desirable to update the state, or content, attributes of the selected rectangle to interested EC's for possible display and editing. Again, graphics object editor 412 (or object editor extension 442 in one embodiment) fills out a graphics auditor data structure and sends it via an object editor extension 442 and API 440 to data switching system 400. Since the interest type is now graphics instead of tool, a graphics auditor data structure instead of a tool auditor data structure is utilized.

Since the auditor data structure received from object editor 412 is now a graphics auditor data structure, data switching system 400 consults graphics-interested objects roster 426 to ascertain the EC's that have expressed an interest in graphics attribute data. The consultation of graphics-interested objects roster 426 may, for example, reveal that EC's 406 and 408 have expressed interest in receiving and responding to attribute data relating to graphics. Data switching system 400 then sends the received graphics auditor data structure the interested EC's, i.e., EC's 406 and 408. In the present example, EC 406 may represent the EC that displays to the computer user the current pen color, and EC 408 may represent the EC for editing the fill color within the selected rectangle.

Note that EC's 402, 404, and 410, not having registered their interest earlier as EC's that are interested in receiving and responding to graphics attribute data, do not have to receive and respond to graphics auditor data structures. Specifically, EC 410, being an EC that is interested only in text attribute data, neither receives nor responds to tool auditor data structures and graphics auditor data structures from data switching system 400.

Figure 5:
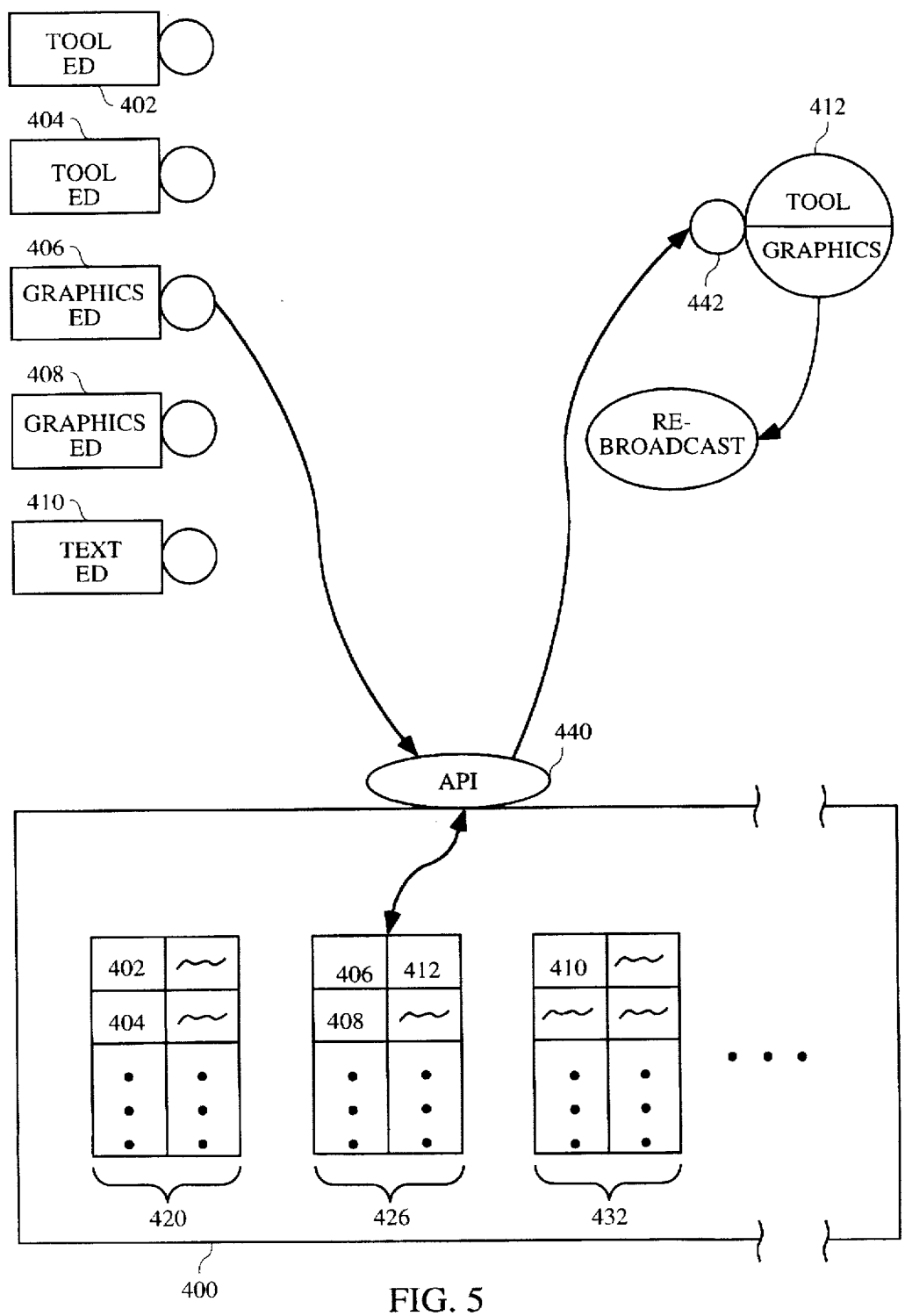
FIG. 5 is a diagram illustrating the communication between a data switching system, editing controllers, and graphics object editors when an editing controller needs to update interested object editors of the changes in attribute data.

When a computer user manipulates the controls of an EC to edit the attribute data in an auditor data structure, the changed attribute data needs to be communicated to the interested object editors to permit the object editors to render the changed attribute data in its contents. FIG. 5 is a diagram illustrating the communication between data switching system 400, EC's 402–410, graphics object editor 412, when an EC needs to update interested object editors of the changes in attribute data. The communication between an EC and an object editor may best be understood by a specific example.

In FIG. 5, the EC's received graphics auditor data structure from graphics object editor 412 for updating itself. Consider the situation where the computer user manipulates controls on an EC, e.g., EC 406, to change the fill color of a selected graphics image in graphics object editor 412, say from red to blue. When EC 406 is manipulated, the data values representing the fill color in the graphics auditor data structure will be changed to reflect the fill color change from red to blue. EC 406 then sends the graphics auditor data structure with the changed attributes representing the new fill color to data switching system 400 (via API 400 and an EC extension, in one embodiment).

Since the received auditor data structure is a graphics auditor data structure, data switching system 400 preferably consults graphics-interested objects roster 426 to ascertain the object editors that have registered their interest in receiving and responding to graphics attribute data. Typically, there may be a plurality of object editors that have expressed their interest in receiving and responding to graphics attribute data. However, there is typically only one object editor that is the focus of user operation in a ECDP document at any given time. In one embodiment, the received graphics auditor data structure is sent by data switching system 400 to only the object editor that both has expressed an interest in receiving graphics attribute data and represents the object editor that is the focus of user operation. In another embodiment, however, data switching system 400 may send the received graphics auditor data structure to more than one graphics object editor that have expressed their interest in receiving and responding to graphics attribute data, irrespective of whether the receiving graphics object editor is being the focus of user operation.

Upon receiving the graphics auditor data structure with the changed attributes, graphics object editor 412 then renders the change in the selected content using the newly-edited attribute data. In one embodiment, the ECDP advantageously rebroadcasts the attributes of the selected content after it has finished rendering the attribute changes using the received auditor data structure. Rebroadcasting advantageously permits the EC that has sent the auditor data structure containing the changed attribute data to receive the actual post-change attribute state of the selected content and to determine whether the intended changes have taken place. Further, rebroadcasting advantageously permits EC's that might not have known about the changed attributes to update themselves. In one embodiment, rebroadcasting also permits a specialized EC to visually display the new attributes for the user's benefit. The steps involved in rebroadcasting the attributes of a selection are analogous to the steps involved in FIG. 4.

To further elaborate on the rebroadcasting aspect of the invention, consider the example below. In one embodiment, there may be provided an EC, which is capable of editing the attribute data of a graphics auditor data structure. In accordance with one aspect of the present invention, as long as both the object editors and this EC can understand the data in the graphics auditor data structure, this EC can work with a variety of graphics object editors. Suppose further that one object editor represents a high-end graphics package, say one that is capable of rendering the fill color of a selected graphics image in 16 million colors, while the second graphics object editor represents a simple to use a children's drawing program. The children drawing program may be capable of rendering the fill color in, say, 16 different colors only.

Consider the situation where the graphics EC receives a graphics auditor data structure relating to a selected graphics image in the children's drawing program, and the computer user, using the aforementioned graphics EC, changes the value representing the fill color from, say, 11 to 315. Eleven is a legitimate color in the children's drawing program, but 315 is outside of the range of colors that the children's drawing program is capable of rendering. Note that if the changes had been made to a selected graphics image in the high-end graphics package, 315 would have been a legitimate fill color value.

In this case, the graphics auditor data structure containing the illegal fill color value may be sent from the graphics EC to data switching system 400 (via an API and, in one embodiment, via an extension associated with the EC). Data switching system 400 then forwards this graphics auditor data structure containing the illegal fill color attributes, i.e., 315, to the children's drawing program.

In one embodiment, the children's drawing program may ignore the illegal attempt to change the fill color. During rebroadcasting, the graphics EC that sent the graphics auditor data structure containing the illegal fill color value and the user may be notified that the attempted attribute change has not taken effect. Notification occurs because the change that was desired and the change that was actually rendered by the graphics object editor representing the children's drawing program are different. In another embodiment, the children's drawing program may attempt to come as close as possible to the desired attribute value, say change the value of the fill color of its selected object to the maximum value of 16, and rebroadcast to notify the EC that sent out the graphics auditor data structure containing the attribute change and/or the user that an attempt has been made to effect a change in the fill color. By inspecting the rebroadcasted auditor data structure, the EC and/or the user may then take appropriate corrective actions.

As mentioned earlier in FIG. 5, an auditor data structure is typically sent from an EC to only the interested object editor that is also the focus of user operation. This feature essentially allows the user greater control in determining which piece of content data will be changed when controls in an EC are manipulated to change the attribute data in an auditor data structure. In other words, it protects the content associated with object editors that are not the focus of user operation from being changed without the computer user's knowledge.

There are cases, however, in which it may be advantageous to permit the changed attributes to be applied to similar object editors throughout the ECDP document instead of just to the interested object editor that is the focus of user operation. By way of example, there may exist, in one embodiment, an ECDP document in which there are embedded two different text object editors, only one of which is currently the focus of user operation. When the user manipulates an EC to spell check the ECDP document, it may be desirable to make corrections to all incorrectly spelled text objects, regardless whether that incorrectly spelled text object is associated with the text object editor that is the focus of user operation, or with the text object editors that are not the focus of user operation (assuming they are both interested). Because the EC's and the object editors of the present inventive ECDP document are completely decoupled from another and only communicate through a data switching system, it is possible to implement a service to allow changes in attributes to be applied to more than one object editor.

Figure 6:
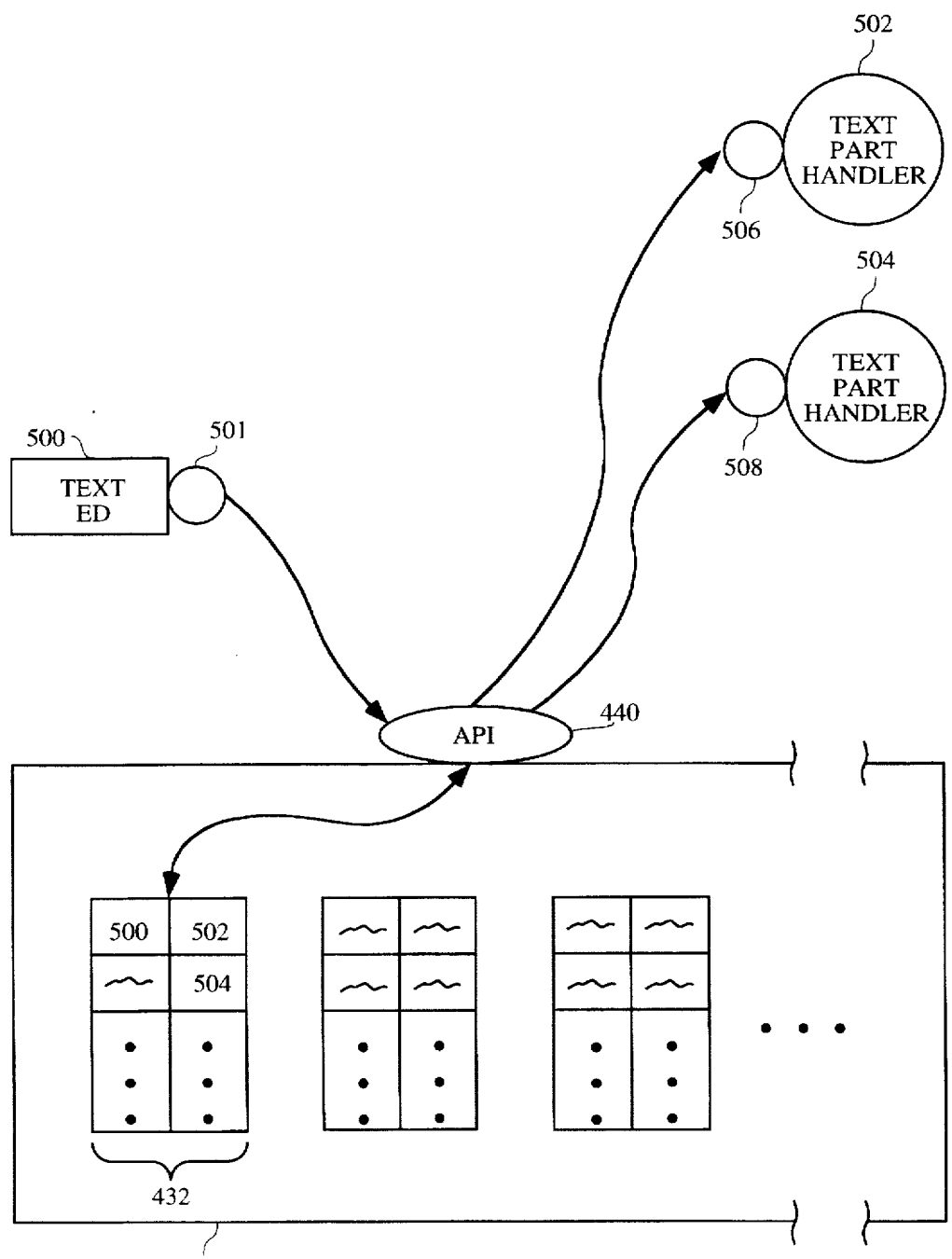
FIG. 6 is a diagram illustrating the communication paths involved when attributes that are changed by an editing controller may be applied to more than one object editor.

FIG. 6 is a diagram illustrating the communication paths involved when attributes that are changed by an EC may be applied to more than one object editor. Referring now to FIG. 6, there is again shown a data switching system 400. Within data switching system 400, shown is a text-interested objects roster 432. Further, FIG. 6 shows an EC 500, implementing, for example, a spell checker. There are also shown two text object editors 502 and 504.

In one embodiment, text object editors 502 and 504 may represent existing object editors in a typical compound document architecture. In that case, there may be provided extensions 506 and 508 for permitting text object editors 502 and 504 respectively to communicate with data switching system 400. Similarly, if EC 500 represents a spell checker editing controller that already exists in a traditional compound document architecture, there may be provided an EC extension 501 for permitting EC 500 to communicate with data switching system 400. As mentioned earlier, however, if the ECDP is not implemented on top of an existing traditional compound document architecture, an EC and its extension (as well as an object editor and its extension) may be implemented as a single unit.

When spell checker EC 500 makes a correction to a selection, say changing "teh" to "the", spell checker EC 500 may, in one embodiment, forward a reference, e.g., a memory address or a pointer, to extension 501 to data switching system 400. Since the auditor data structure sent from spell checker EC 500 is of a text interest, data switching system 400 will consult text-interested objects roster 432 to ascertain the object editors that have registered their interest in receiving and responding to text attribute data. After consulting text-interested objects roster 432, data switching system 400 may, for example, determine that text object editors 502 and 504 are registered in text-interested objects roster 432.

Data switching system 400 may then forward the reference from EC 500 to both text object editors 502 and 504. In one embodiment, text object editors 502 and 504 then use the address to directly receive the changed data from spell checker EC 500. The direct communication paths between EC 500 and text object editors 502 and 504 are represented symbolically in FIG. 6 as paths 530 and 532, respectively. If the inventive ECDP is implemented with extensions, the direct paths 530 and 532 are preferably routed through respective extensions of the EC and the object editor.

In one embodiment, the inventive ECDP advantageously implements communication between an EC and each object editor in a sequential manner. When communication is implemented sequentially, interaction between an object editor and the EC in question may be more effectively monitored by the computer user. For example, a computer user may desire to be prompted whenever a misspelled word is found and a correction is suggested. In this case, the inventive ECDP may first establish direct communication path 530 between spell checker EC 500 and text object editor 502. Once the embedded text data in text object editor 502 is spell-checked, text object editor 504 is then put in communication with spell checker EC 500. It is contemplated, however, that the user may simply wish to effect spell-checking in the content of both text object editors 502 and 504 without prompting. In this case, the inventive ECDP may establish both communication paths 530 and 532 substantially simultaneously to effect substantially simultaneous spell-checking in both text object editors 502 and 504 in the ECDP document.

In the examples given above, it is contemplated that there exists a specialized auditor data structure for each interest type. For example, there is a text auditor data structure for communicating text attribute data. Similarly, graphics and tool auditor data structures exist to respectively communicate attribute data relating to graphics and tools respectively. The use of specialized auditor data structures, while being efficient in some cases, also limits the flexibility of the resultant ECDP document. This is because specialized auditor data structures requires knowledge of the content model of the content at compile time.

In accordance with yet another aspect of the present invention, there is provided a generic auditor data structure which is capable of representing the attributes of all types of selected contents. To make the generic auditor data structure truly generic, there are preferably provided fields for describing all possible attributes in all types of object editor data. Each attribute represents one aspect of the object editor data. Further, it is preferable that the attributes be described by primitive data types, typically native to the programming language itself, that are easily understood by all object editors and EC's.

In one embodiment of the ECDP, i.e. one implemented as an extension of Apple OpenDoc™ and known as VSX, the attributes are described partly by constants in the AppleEvents Registries and in the VSX Registries. In the VSX world, editing controllers are known as widgets. AppleEvents Registries are four-byte wide descriptors for describing certain aspects of an object editor's content. For example, a constant in AppleEvents Registry may represent the text font attribute and another constant may represent the pen color attribute. VSX also has a set of constants, known as VSX registries, to describe object editor contents that are not adequately described by AppleEvents Registries. For further information regarding AppleEvents Registries, reference may be made to a publication entitled "AppleEvents Registries: Standard Suite" (Apple Computer, Inc., 1991), which is available from Apple Computer, Inc. of Cupertino, Calif. A list of VSX registries is also included herein.

The use of constants, such as AppleEvents or VSX Registries constants, that may be understood by both the object editors and the EC's advantageously permit an object editor to work with a wide range of EC's and vice versa. In this sense, AppleEvents and VSX Registries constants perform the function typically fulfilled by primitive and native data types in a generic auditor data structure.

Figure 7A:
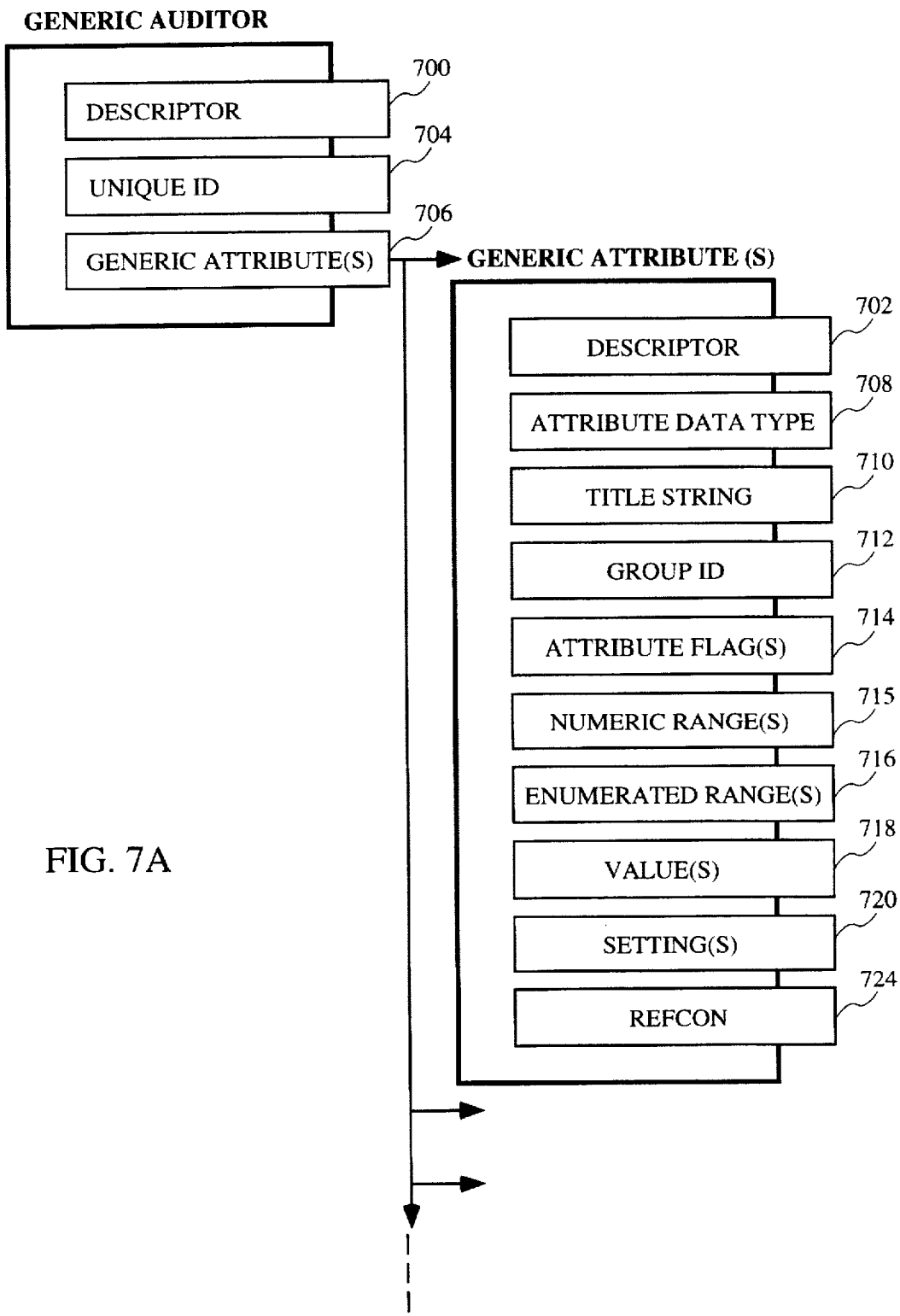
FIG. 7A shows the format of a generic auditor data structure in accordance with one embodiment of the present invention.

FIG. 7A shows the format of a generic auditor data structure in accordance with one aspect of the present invention. Descriptor field 700 represents, in one embodiment, the interest type. By way of example, descriptor field may, in one embodiment, include four-byte wide constants that describe an interest type as either text, graphics, tool, sound, or the like. Generic attribute descriptor field 702 represents, in one embodiment, either an AppleEvents or a VSX Registries constant to describe one aspect of the selected object editor content. Unique ID field 704 may optionally be provided to allow an object editor to uniquely and easily identify a generic auditor data structure. In one embodiment, the value in Unique ID field 704 is assigned by VSX, either sequentially or randomly.

There is also provided with each generic auditor data structure a list of generic attributes in Generic Attribute(s) field 706 for describing different aspects of the object editor contents. There are advantageously as many attributes in Generic Attribute(s) field 706 as may be necessary to describe all possible object editor contents. Each attribute in Generic Attribute(s) field 706 may have one or more generic attribute, described by fields 702, 708, 710, 712, 714, 715, 716, 718, 720, and 724. Attribute Data Type field 708 provides a way for the object editor to describe the data type of the object editor content which the generic auditor data structure characterizes. In one embodiment, there are, for example, three numeric types (long, fixed, and float), and two enumerated types (enumerated mutually exclusive and enumerated non-exclusive).

As an illustration, if a line of text is selected in a text object editor, the "text" interest is reflected in Descriptor field 700. The text style attribute may be represented by a constant in Generic Attribute Descriptor field 702, and Attribute Data Type field 708 may be, for example, enumerated non-exclusive. The data type represented by field 708 is non-exclusive because a character of text may have two text styles, e.g., both bolded and underlined. If the attribute had been a font attribute, its data type may have been, for example, enumerated mutually exclusive. This is because a character of text may have only one font. Optional RefCon field 724 represents a generic data structure extension facility. In one embodiment, RefCon field may be as simple as a pointer. Via RefCon field 724, data and functions may be added to an existing generic data structure, thereby advantageously permitting future extensions of the functionalities of the generic auditor data structure.

The remaining fields of the generic auditor data structure may best be understood with reference to specific examples. It should be noted at this point that although FIGS. 7A–11 show a generic data structure having a specific organization and specific data types in its fields, it should be noted that a generic data structure implemented in accordance with one aspect of the present invention may have other types of organization and other data types. Further, although it is, as mentioned earlier, preferable that the generic data structure utilizes data types that are primitive and native to a programming language, such is not a requirement. All that is required for object editors and EC's to communicate is that they both use a generic data structure having an organization and data types that both could understand. By way of example, object editors and EC's may communicate using a generic, auditor data structure having more "sophisticated" data types such as arrays and records.

FIGS. 7B–11 shows in a simplified formats a few examples of the data values represented in the fields of a generic data structure when the generic data structure is utilized to describe a variety of interests. Note that while each interest, e.g. text, graphics, tool, is described individually, there may exist, in one embodiment, a generic auditor data having all the necessary fields for communicating with object editors and editing controllers of different interest types. For example, it is possible to implement a generic auditor data structure with all fields necessary for describing tool, text, and graphics attributes as shown in FIGS. 7B–11, and the responsible object editor then fills out whichever field necessary for describing the attributes of its selection. On the other hand, it is contemplated that there may be provided generic auditor data structures for each of the interests or a combination of some interests. The use of interest-specific generic auditor data structures may result in more efficient communication in some cases.

Figure 7B:
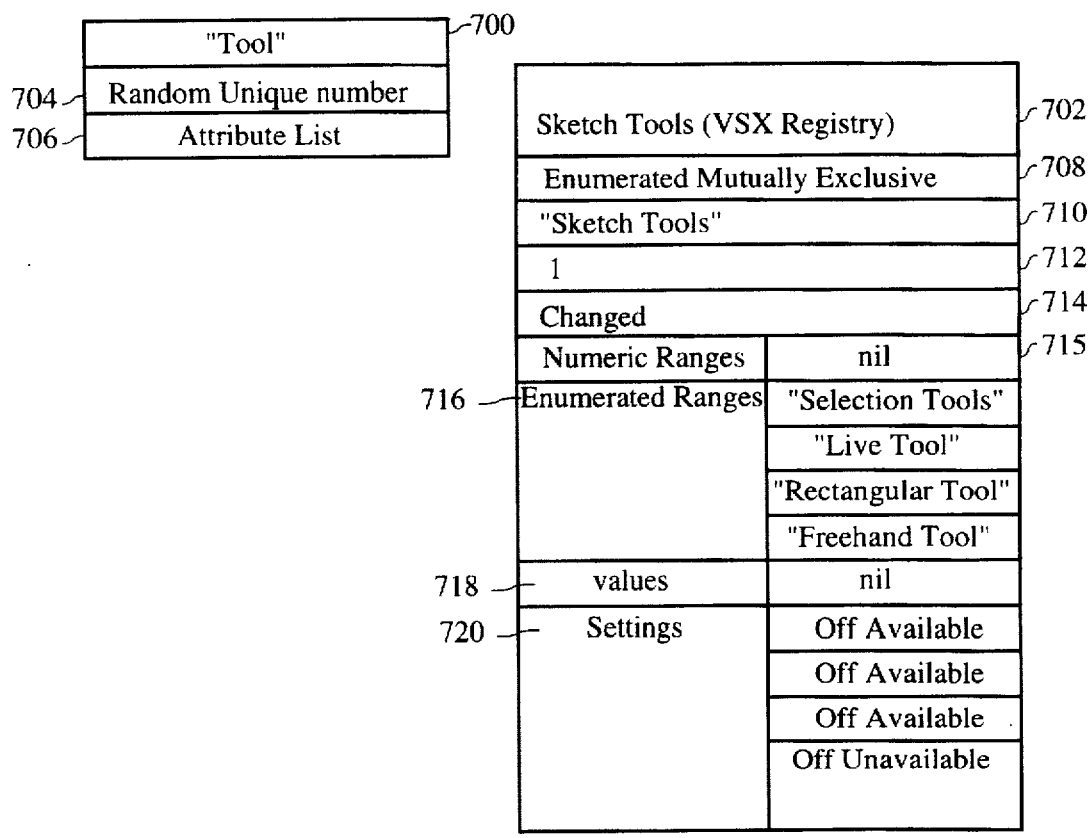
FIG. 7B shows the possible values that a generic auditor data structure may have in describing a tool interest in accordance with one embodiment of the present invention.

FIG. 7B shows in a simplified format the possible values that a generic auditor data structure may have in describing a tool interest. Referring now to FIG. 7B, there is shown a field 700 which contains the four-byte wide description for the interest type of the generic auditor data structure. Since the generic auditor data structure of FIG. 7B represents a generic auditor data structure which describes a tool interest, there exists in field 700 of FIG. 7B a four-byte code which describes that this generic auditor data structure relates to tool. Optional field 704 is a random unique number whose value is assigned by ECDP to optionally permit the object editors and the EC's to uniquely identify this generic auditor data structure.

As mentioned earlier, Generic Attribute(s) field 706 comprises a plurality of attribute values. Field 702 may show the four byte code in the VSX registry which identifies the tool described by the generic auditor data structure of FIG. 7B. Field 708 contains the data type of the tool described by field 702. In the example of FIG. 7B, the data type is enumerated mutually exclusive, denoting the fact that there may be only one sketch tool active at any given time.

Optional Title String Field 710 in the example of FIG. 7B may read, for example, "Sketch Tools." Title string field 710 is optional and provides a way to communicate to the user, via some appropriate EC, of the attribute information the generic auditor data structure represents.

By way of example, there exists in one embodiment of the ECDP an inspector EC whose job is to display the attributes of a generic auditor data structure. In one embodiment, the inspector EC parses the contents of a generic data structure and displays those attributes onscreen for viewing by the user.

Optional group ID field 712 contains group ID data. The use of a group ID provides a way of identifying EC's that may be related. For example, a particular text object editor may wish to identify that a generic auditor data structure for describing font size is related in a family to a generic auditor data structure that describes text styles.

Attribute Flag(s) field 714 indicates whether the attributes of the generic auditor data structure of FIG. 7B represents a new attribute, i.e., whether the attributes have been change recently. The use of Attribute Flag(s) field 714 permits an object editor or an EC to ascertain quickly whether a generic auditor data structure contains new attribute data, or nothing has changed in the attributes of the selected content and updating is therefore not necessary.

By way of example, an Attribute Flag(s) field 714 that reads, as it does in FIG. 7B, "changed" signifies that the attributes that are represented by Attribute Descriptor field 702 has changed. Numeric Ranges field 715 in the generic auditor data structure of FIG. 7B shows a value nil since the data type of the sketch tools, which is reflected in Attribute Data Type field 708, is enumerated mutually exclusive.

Enumerated Ranges field 716 includes, for simplicity of illustration, a simple list of enumerated values. By way of example, enumerated ranges 716 may include, as shown in FIG. 7B, selection tool, line tool, rectangle tool, and freehand tool, representing the range of tools that may be represented by the generic auditor data structure of FIG. 7B. It should be understood that although the basic structure of a generic auditor data structure does not change when it is utilized by different object editors, the values represented in the fields of a generic auditor data structure may in fact vary. By way of example, the aforementioned children's drawing program may have an Enumerated Ranges field 716 having relatively few values while a sophisticated high-end graphics package may have a richer Enumerated Ranges field 716, whose values may include, in addition to the enumerated values of the children's drawing programs, additional enumerated values.

Value(s) field 720 reads nil for the generic auditor data structure of FIG. 7B since the data types representing the sketch tools are enumerated mutually exclusive, and not a numeric value. Setting values in Setting(s) field 720 reflect the setting of each tool represented in the Enumerated Ranges field 716. In the example of FIG. 7B, the first value in Setting(s) field 720 corresponds to the first tool listed in Enumerated Ranges 768, i.e. Selection Tool in the present example. Further, Setting(s) field 720 indicates that the selection tool is off but available. A tool is said to be available when it is capable of being selected for use by the computer user in changing the tool state of the current object editor. Line tool is indicated to be also off and available, while rectangle tool is indicated to be on and available. Free-hand tool of Enumerated Ranges field 716, on the other hand, is indicated in Setting(s) field 720 to be off, unavailable. In this case, the EC representing the free-hand tool in the UI container may be dimmed (indicating that it is incapable of changing the tool state of the current graphics object editor).

Figure 8:
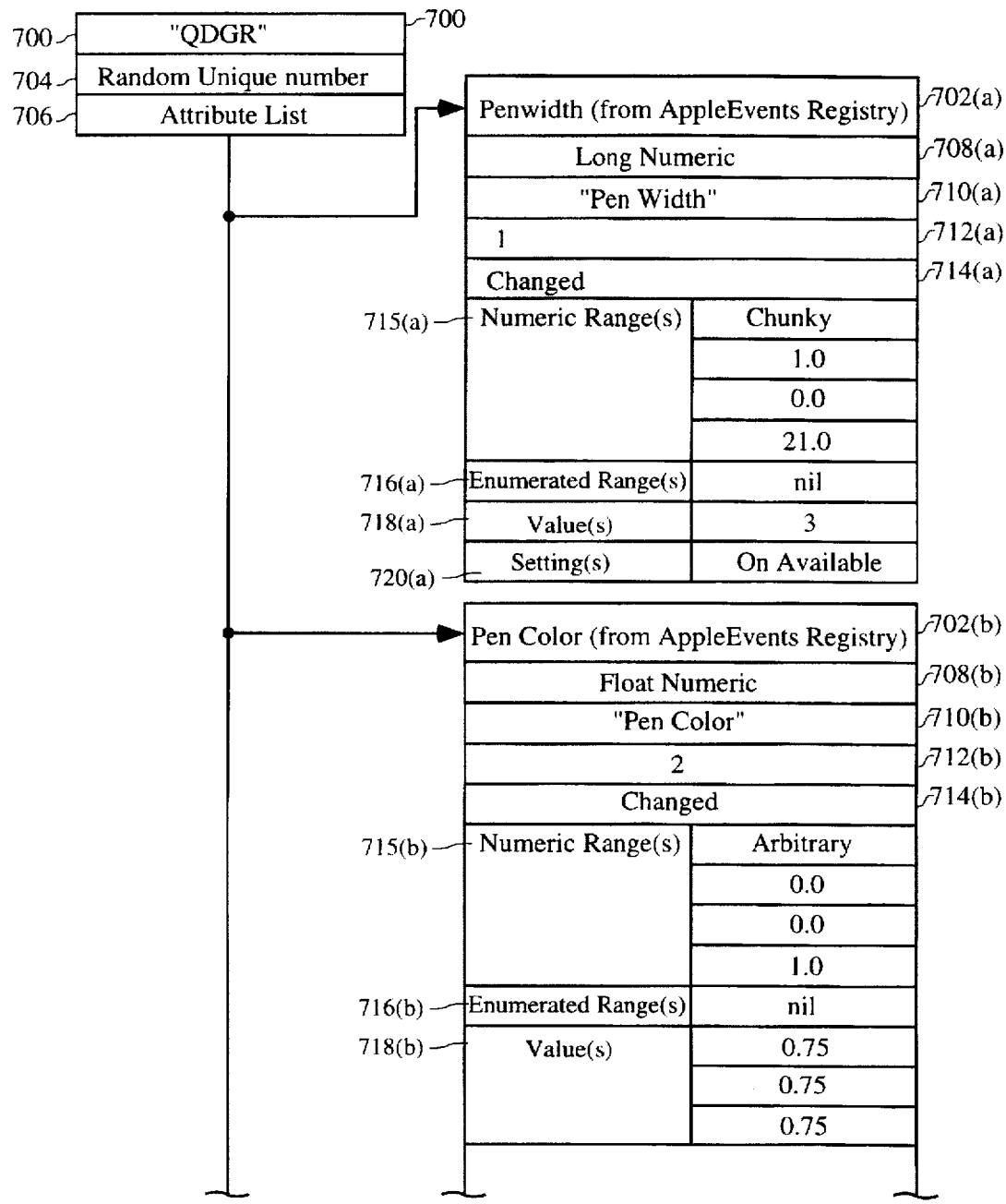
FIG. 8 shows an example of a generic auditor data structure for describing graphics attributes in accordance with one embodiment of the present invention.
Figure 9:
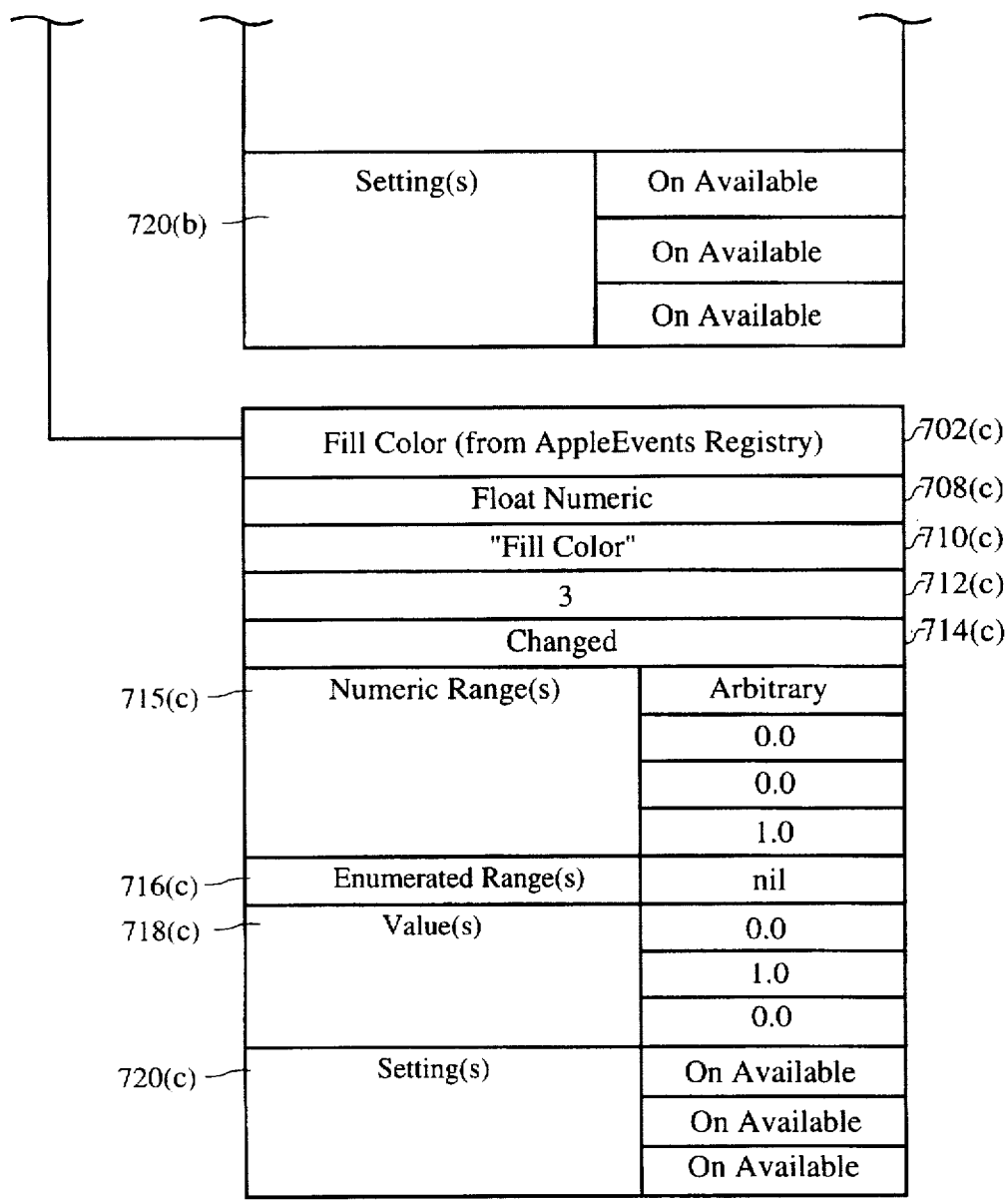
FIG. 9 is a continuation of FIG. 8.

FIGS. 8 and 9 show in a simplified format an example of a generic auditor data structure for describing graphics attributes. As discussed in connection with FIG. 7B, there is shown a Descriptor field 700 which in this case, contains the four-byte representation of a QuickDraw graphics interest. Optional Random Unique Number field 704 may again be assigned a random number by the ECDP. For discussion purposes, Generic Attribute(s) field 706 in the example of FIGS. 8 and 9 include three attributes: PenWidth, PenColor, and FillColor.

PenWidth attribute 702(*a*) is represented, in one embodiment, by a four-byte wide constant from the AppleEvents Registry. The size of the PenWidth is represented in field 708(*a*) by the long numeric attribute data type. Optional Title String field 710(*a*) reads "Pen Width" for permitting the computer user to identify the attribute information in one embodiment. Attribute Flag(s) field 714 (*a*) indicates that changes have been made to the attributes of this graphics-related generic auditor data structure, while Numeric Range(s) field 715(*a*) shows the ranges of the numeric values for pen width.

In one embodiment, a numeric range is preferably expressed by a number of sub-fields, including, for example, range kind, step size, minimum value, and maximum value. For example, a numeric range may include a range kind known as "chunky," indicating that the range of numeric values is segmented into chunky blocks. Step size of Numeric Range(s) field 715(*a*), however, is shown to be 1.0, while the minimum value is 0.0 and the maximum value is 21.0.

Enumerated Range(s) field 716(*a*) is nil for the graphics-related generic auditor data structure of FIG. 8 since the attribute data type of pen width is long numeric, not enumerated. Value(s) field 718(*a*) contains a value 3, representing the current pen-width. Setting(s) field 720(*a*) indicates that the EC implementing pen-width is on and available.

PenColor represents another attribute descriptor in the Generic Attribute(s) field 706 of the generic auditor data structure of FIGS. 8 and 9. Attribute data type for pen color is shown in Attribute Data Type field 708(*b*) to be float numeric, while optional Title String field 710(*b*) is shown to be "pen color." Pen color attribute is shown in optional Group ID field 712(*b*) to have a group ID of 2.

Attribute Flag field 714(*b*) reads "changed," indicating that changes have been made to the pen color attributes of the graphics-related generic auditor data structure of FIG. 8. Numeric Range(s) field 715(*b*) has a range kind of arbitrary, a step size of 0.0, a minimum value of 0.0, and a maximum value of 1.0.

Note that the step size of Numeric Range field 715(*b*) is shown to be 0.0. In the implementation of FIG. 8, a 0.0 step size indicates that the step size of the numeric range depends on particular computers and particular operating systems. Since the range kind is arbitrary, the resolution of the step size may be as fine as allowable by either the computer or the operating system. Enumerated Ranges field 716(b) is shown to be nil for the pen color attribute of FIG. 8 since the attribute data type for pen color is float numeric, not enumerated. Value(s) field 718(b) shows three current values for red, green, and blue.

FIG. 9 is a continuation of FIG. 8. Setting(s) field 720(b) shows that the EC for editing the values representing pen color are all currently on and available.

FillColor (Descriptor field 702(c)) represents another attribute descriptor in the Generic Attribute(s) field 706 of the generic auditor data structure of FIGS. 8 and 9. Like PenWidth and PenColor, FillColor interest type is also represented in the embodiment of FIG. 8 by a four-byte wide constant from the AppleEvents Registry. Attribute Data Type field 708(c) is float numeric, and optional Title String field 710(c) shows a user-readable string "fill color".

Optional Group ID field 712(c) shows that fill color attribute belongs in Group ID 3 while Attribute Flag(s) field 714(c) indicates that changes have been made to the fill color attribute. In Numeric Range(s) field 715(c), the numeric range for the fill color indicates that the range kind is arbitrary, the step size is 0.0, the minimum is 0.0, and the maximum is 1.0. Enumerated Range(s) field 716(c) is nil since the attribute data type for fill color is float numeric, not enumerated. Value(s) field 718(c) shows that currently, red has a value of 0.0, green has a value of 1.0, and blue has a value of 0.0. Further, Setting(s) field 720(c) shows that all EC's for manipulating the fill color, i.e., red, green, and blue editing EC's, are all on and available.

Figure 10:
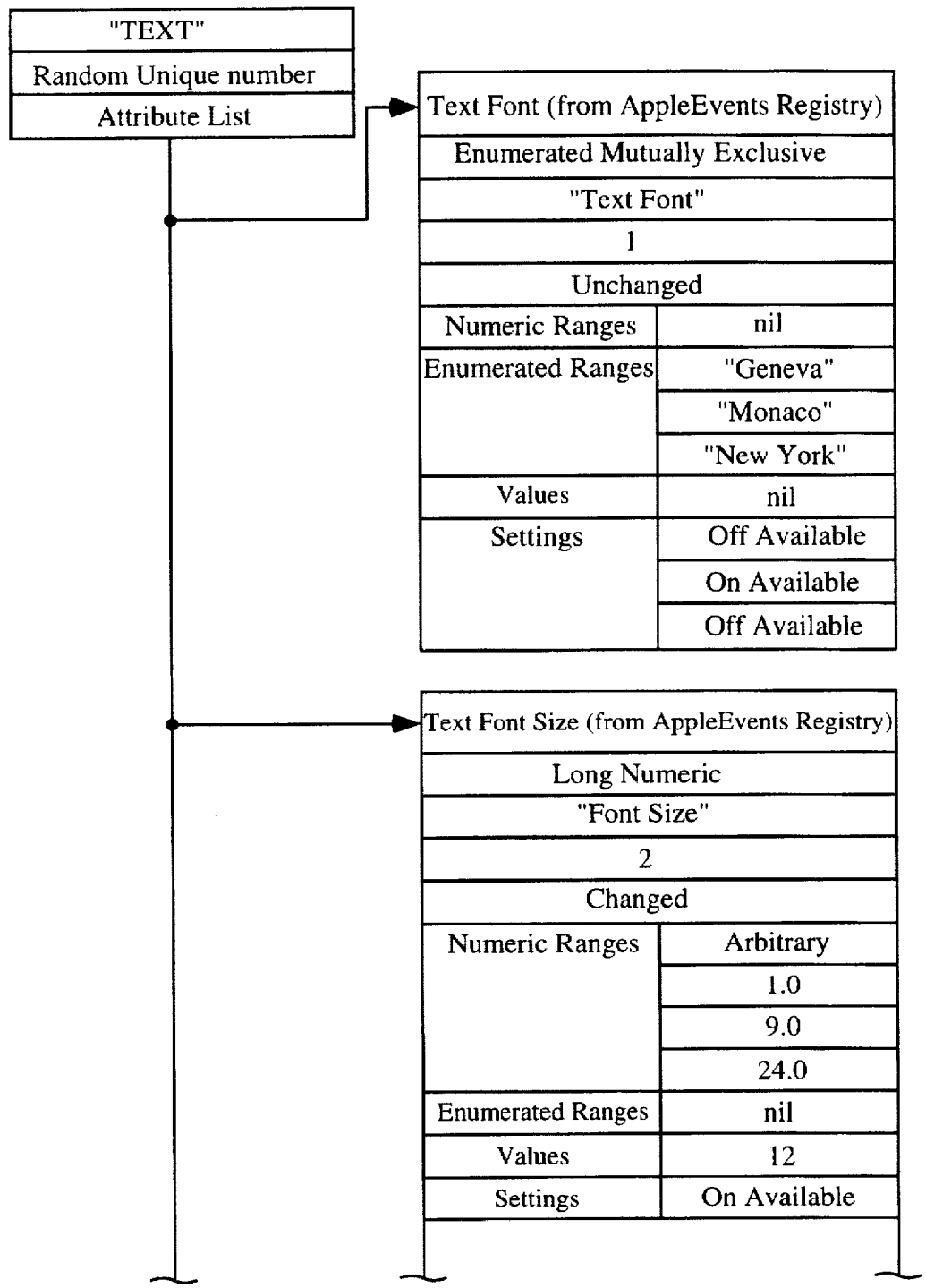
FIG. 10 shows a generic auditor generic data structure for describing text attributes in accordance with one embodiment of the present invention.
Figure 11:
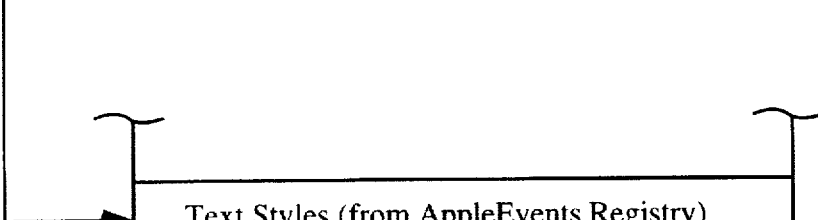
FIG. 11 is a continuation of FIG. 10.

FIGS. 10 and 11 show a generic auditor generic data structure for describing text attributes in accordance with one aspect of the present invention. The fields in the generic auditor data structure for describing text attributes are related to one another in a manner which is similar to that discussed in connection with FIGS. 7A, 8, and 9, and is not repeated here.

It should be noted that FIGS. 7-11 illustrates one implementation of a generic auditor data structure that is capable of representing the attributes of either text, graphics, or tool interest. The use of a single generic auditor data structure for communicating different interest types advantageously obviates the need for specialized auditor data structures.

More importantly, since a generic auditor data structure is capable of representing attributes of any content models, generic auditor data structures inherently can represent content models which may previously be unknown to an ECDP document. In this sense, the use of a generic auditor data structure flexibly permits a wide range of objects to be embedded, regardless whether their content models are known, in a ECDP document. Unlike prior art compound document architectures, objects that are seemingly incompatible or have little in common with one another can now communicate using a generic auditor data structure and a data switching system to fulfill a functional role in an ECDP document. Most importantly, it is not necessary for the computer user to know the content models of these objects before embedding them in an ECDP document. The job of representing the content is now performed by the generic auditor data structure and communication between embedded object editors and embedded EC's using the common currency of the generic auditor data structure now takes place through a data switching system. Consequently, the combination of a generic auditor data structure and the inventive ECDP architecture permits a user to embed an object and to make use of that object's functionalities without having to worry about whether that object has a content model that may be incompatible with content models of other object editors and EC's.

Although the foregoing invention has been described in some detail for purposes of clarity of understanding, it will be apparent that certain changes and modifications may be practiced within the scope of the appended claims. For instance, although the specification has been described in detail different methods for performing updates of the EC's and the object editors, these steps do not, in some instances, have to follow the exact sequence described and may be modified to achieve substantially the same result by one skilled in the art without departing from the scope and spirit of the present invention.

Further, although the invention is described using flow diagrams as an illustration aid, it should be noted that the methods and apparatus of the present invention may be event-driven, capable of executing multiple processes at the same time. As such, different processes and tasks do not necessarily have to be performed in the specific sequential order chosen for illustration, and a computer and/or software program implementing the inventive method may be executing other tasks while executing the inventive method disclosed herein.

Such adaptation and optimization, as well as others within the abilities of those of skills in the art, may be performed on the apparatus and methods disclosed herein without departing from the scope and spirit of the present invention. Consequently, the scope of the invention is not limited to the specific examples given herein but is set forth in the appended claims.

```
*************************************************/
#ifndef __VSXRegistry__
#define __VSXRegistry__
//------------------------------------------------
#ifndef __AERegistry__
#include "AERegistry.h"
#endif
//------------------------------------------------
//          Types, Constants and Defines
//
// AppleEvent Class and Property descriptors from the AERegistry
//       used as Auditor and Attribute descriptors within VSX
//
// cGraphicShape
//       pPenWidth
//       pPenColor
//       pFillColor
//
// cText
//       pTextFont
//       pTextPointSize
//       pTextStyles
//       pTextColor
//
//------------------------------------------------
#define    kStringListRezType           'VsxS'
#define    kGenericAuditorInfo   "GenericAuditor:Property:String"
//------------------------------------------------
// Auditor and Attribute descriptors specific to VSX
//
// *** String 'VsxS' resource IDs
const   long    kPenColorStrID         = 128;
const   long    kFillColorStrID        = 129;
const   long    kPenSizeStrID          = 130;
const   long    kSelectionArrowStrID   = 131;
```

-continued

```
const    long    kRectangleStrID    = 132;
const    long    kOvalStrID         = 133;
const    long    kRoundRectStrID    = 134;
const    long    kLineStrID         = 135;
const    long    kArcStrID          = 136;
const    long    kTriangleStrID     = 137;
const    long    kStarStrID         = 138;
const    long    kTextStrID         = 139;
const    long    kFontColorStrID    = 140;
const    long    kFontSizeStrID     = 141;
const    long    kFontStyleStrID    = 142;
const    long    kNormalStrID       = 143;
const    long    kBoldStrID         = 144;
const    long    kItalicStrID       = 145;
const    long    kUnderlineStrID    = 146;
const    long    kOutlineStrID      = 147;
const    long    kShadowStrID       = 148;
const    long    kCondenseStrID     = 149;
const    long    kExtendStrID       = 150;
const    long    kShapeTypeStrID    = 151;
const    long    kToolStrID         = 152;
const    long    kSketchToolsStrID  = 153;
const    long    kFontFaceStrID     = 154;
const    long    kDocRectStrID      = 155;
const    long    kViewRectStrID     = 156;
const    long    kScrollStepStrID   = 157;
//-----------------------------------------------
const    long    cTool          = 'tool';
const    long    pSketchTools   = 'sktl';
const    long    pShapeType     = 'shtp';    /* 0x63706172 */
const    long    pDocumentRect  = 'drct';
const    long    pViewRect      = 'vrct';
const    long    pScrollStep    = 'sstp';
// *** Tools...
enum tSketchToolType {
        kNullTool = 0,           // Empty tool
        kSelectionTool = 1,      // Arrow tool
        kRectSketchTool,
        kOvalSketchTool,
        kRndRectSketchTool,
        kLineSketchTool,
        kArcSketchTool,
        kTriangleSketchTool,
        kStarSketchTool,
        kSTTForceShort           = 32767
};
// *** Shapes...
enum tShapeType {
        kNullShape = 0,
        kRectType = 1,
        kOvalType,
        kRndRectType,
        kLineType,
        kArcType,
        kTriangleType,
        kStarType,
        kTextType,
        kSTFForceShort           = 32767
};
//-----------------------------------------------
#endif
```

What is claimed is:

1. A computer-implemented method for creating a compound document in a computer, comprising:
    embedding a first object editor in said compound document for rendering first data in a first data content area of said compound document, said first object editor representing a container of said compound document;
    embedding a second object editor in said compound document for rendering second data in a second data content area of said compound document, said first data content area and said second data content area being mutually exclusive;
    embedding a plurality of editing controllers in said compound document for selectively editing attributes of a selection of one of said first and second data;
    providing a first auditor data structure including:
        first data fields for representing said attributes, said first data fields implementing a first protocol decipherable by at least one of said first object editor and said second object editor, and being further decipherable by said editing controllers; and
    providing a data switching system for passing said first auditor data structure between said editing controllers and said first and second object editors, wherein said data switching system determines which one of said plurality of editing controllers receives said first auditor data structure based on interest registered by each of said plurality of editing controllers with said data switching system.

2. The computer-implemented method of claim 1, wherein said first protocol is decipherable by both said first object editor and said second object editor.

3. The computer-implemented method of claim 1 wherein said first protocol is decipherable by said first object editor and said editing controllers, said compound document further comprising providing a second auditor data structure having second data fields for representing said attributes of a selection of said second data, said second data fields implementing a second protocol decipherable by said second object editor and said editing controllers.

4. The computer-implemented method of claim 1 wherein said first data fields contain data types that are native to a programming language.

5. In a computer, a method for communicating attribute data between a plurality of object editors and a plurality of editing controllers in a compound document, one of said object editors representing a provider for said compound document, said compound document being capable of rendering different data types simultaneously in different content areas of said compound document, comprising:
    selecting an auditor data structure capable of representing first attributes of a selection in one of said content areas of said compound document;
    filling out data fields of said auditor data structure, using an object editor associated with said one of said content areas, with data relating to said first attributes;
    communicating said first attributes, using said auditor data structure, from said object editor to a data switching system; and
    communicating said first attributes, using said auditor data structure, from said data switching system to a selected one of said editing controllers, said selected one of said editing controller being ascertained by said data switching system based on an interest associated with said selected one of said editing controllers.

6. The method of claim 5 wherein said auditor data structure is interest-based.

7. The method of claim 5 wherein said auditor data structure is generic to said plurality of object editors and said plurality of editing controllers of said compound document.

8. The method of claim 7 wherein said data fields of said auditor data structure contain data types which are native to a programming language, thereby capable of being deciphered by said plurality of object editors and said plurality of editing controllers of said compound document.

9. The method of claim 5 wherein said first object editor represents a text editor.

10. The method of claim 9 wherein said second object editor represents a graphics editor.

11. The method of claim 5 wherein said interest associated with said selected one of said editing controllers is tracked in a first roster in said data switching system.

12. The method of claim 11 wherein said interest represents an interest in at least one of said different data types.

13. The method of claim 11 wherein said first roster includes at least two different editing controllers, said at least two different editing controllers representing a subset of said editing controllers that expressed interest in receiving said first attributes, wherein said data switching system sends said auditor data structure to each of said at least two different editing controllers based on said interest in receiving said first attributes.

14. The method of claim 5 further comprising causing another selected one of said editing controllers to fill out said data fields of said auditor data structure, said another selected one of said editing controllers represents an editing controller manipulated by a user of said computer, to communicate second attributes of said selection from said another selected one of said editing controllers to said object editor.

15. The method of claim 14 wherein said data switching system further includes a second roster for tracking object editors of said compound document that are interested in receiving said second attributes.

16. The method of claim 15 wherein said auditor data structure is communicated sequentially from said another selected one of said editing controllers to said object editors to permit said object editors to act on said second attributes in a sequential manner.

17. The method of claim 16 wherein said object editors include at least two different text editors and said another selected one of said editing controllers represents an editing controller for performing spell checking.

18. The method of claim 15 wherein said auditor data structure is communicated substantially parallelly from said another selected one of said editing controllers to said object editors to permit said object editors to act on said second attributes in a substantially parallel manner.

19. The method of claim 18 wherein said object editors include at least two different text editors and said another selected one of said editing controllers represents an editing controller for performing spell checking.

20. A computer program product, comprising a computer usable medium having computer readable code embodied therein for processing data in a compound document, said compound document having a plurality of embedded object editors for respectively rendering data having different interest types in different compound document content areas, one of said object editors representing a provider for said compound document, and a plurality of editing controllers embedded in said compound document, the computer program product comprising:

computer readable program code configured to cause a computer to detect whether a selection is made in one of said data;

computer readable program code configured to cause said computer to effect the filling out of an auditor data structure with first attributes of said selection by one of said object editors, said one of said object editors being associated with said one of said data; and computer readable program code configured to cause said computer to communicate said first attributes embodied in data fields of said auditor data structure from said one of said object editors to interested ones of said editing controllers, wherein said one of said object editors and said interested ones of said editing controllers both register with a data switching system to receive attribute data having an interest represented by said first attributes.

21. The computer program product of claim 20 wherein said auditor data structure is capable of representing attributes of at least two interest types.

22. The computer program product of claim 21 wherein said at least two interest types are text and graphics.

23. The computer program product of claim 20 further comprising computer readable program code configured to cause said computer to change said first attributes embodied in said data fields of said auditor data structure, thereby forming second attributes, when a control in one of said interested ones of said editing controllers is manipulated by a user of said computer program product.

24. The computer program product of claim 23 further comprising computer readable program code configured to cause said computer to communicate said second attributes embodied in said data fields of said auditor data structure from said one of said interested ones of said editing controllers to an interested one of said object editors, wherein said one of said interested ones of said editing controllers and said interested one of said object editors both register with said data switching system to receive attribute data having an interest represented by said second attributes.

25. The computer program product of claim 20 wherein said computer readable program code configured to cause said computer to communicate said first attributes embodied in data fields of said auditor data structure to said interested ones of said editing controllers comprises:

computer readable program code configured to cause said computer to communicate said first attributes embodied in data fields of said auditor data structure from said one of said object editors to said data switching system; and computer readable program code configured to cause said computer to communicate said first attributes embodied in data fields of said auditor data structure from said data switching system to said interested ones of said editing controllers.

26. A computer readable medium containing program instructions for selecting an auditor data structure capable of representing first attributes of a selection in one of content areas of a compound document;

filling out data fields of said auditor data structure, using an object editor embedded in said compound document and associated with said one of said content areas, with data relating to said first attributes, said object editor representing a provider for said compound document; and communicating said first attributes, using said auditor data structure, from said object editor to a selected one of a first plurality of editing controllers, said selected one of said first plurality of editing controllers being ascertained based on an interest associated with said selected one of said first plurality of editing controllers.

27. The computer readable medium of claim 26 wherein said object editor represents a text editor.

28. The computer readable medium of claim 26 wherein said object editor represents a graphics editor.

29. The computer readable medium of claim 26 wherein said communicating said first attributes between said object editor and said selected one of said first plurality of editing controllers is performed through a data switching system.

30. The computer readable medium of claim 29 wherein said interest associated with said selected one of said first plurality of editing controllers is tracked in a first roster in said data switching system.

31. The computer readable medium of claim 30 wherein said first roster includes a second plurality of editing controllers, said second plurality of editing controllers representing a subset of said first plurality of editing controllers that expressed interest in receiving said first attributes, wherein said data switching system also sends said auditor data structure to each of said second plurality of editing controllers based on said interest in receiving said first attributes.

32. The computer readable medium of claim 26 further comprising program instructions configured to cause another selected one of said first plurality of editing controllers to fill out said data fields of said auditor data structure, said another selected one of said first plurality of editing controllers represents an editing controller manipulated by a computer user, to communicate second attributes of said selection from said another selected one of said first plurality of editing controllers to said object editor.

33. The computer readable medium of claim 32 wherein said data switching system further includes a second roster for tracking object editors of said compound document that are interested in receiving said second attributes.

34. The computer readable medium of claim 33 wherein said auditor data structure is communicated sequentially from said another one of said editing controllers to said object editors to permit said object editors to act on said second attributes in a sequential manner.

35. The computer readable medium of claim 34 wherein said object editors include at least two different text editors and said another one of said editing controllers represents an editing controller for performing spell checking.

36. The computer readable medium of claim 34 wherein said auditor data structure is communicated substantially parallelly from said another one of said editing controllers to said object editors to permit said object editors to act on said second attributes in a substantially parallel manner.

37. The computer readable medium of claim 36 wherein said object editors include at least two different text editors and said another one of said editing controllers represents an editing controller for performing spell checking.

* * * * *